(12) United States Patent
Matsuoka et al.

(10) Patent No.: US 8,406,457 B2
(45) Date of Patent: Mar. 26, 2013

(54) MONITORING DEVICE, MONITORING METHOD, CONTROL DEVICE, CONTROL METHOD, AND PROGRAM

(75) Inventors: Miki Matsuoka, Osaka (JP); Tanichi Ando, Komaki (JP)

(73) Assignee: OMRON Corporation, Kyoto (JP)

( * ) Notice: Subject to any disclaimer, the term of this patent is extended or adjusted under 35 U.S.C. 154(b) by 1259 days.

(21) Appl. No.: 12/279,414

(22) PCT Filed: Mar. 15, 2007

(86) PCT No.: PCT/JP2007/055204
§ 371 (c)(1),
(2), (4) Date: Aug. 14, 2008

(87) PCT Pub. No.: WO2007/105792
PCT Pub. Date: Sep. 20, 2007

(65) Prior Publication Data
US 2009/0022368 A1    Jan. 22, 2009

(30) Foreign Application Priority Data
Mar. 15, 2006 (JP) .................. 2006-071683

(51) Int. Cl.
*G06K 9/00* (2006.01)
(52) U.S. Cl. ........................ 382/100; 382/117
(58) Field of Classification Search ............... None
See application file for complete search history.

(56) References Cited

U.S. PATENT DOCUMENTS

| | | | |
|---|---|---|---|
| 5,604,818 A | | 2/1997 | Saitou et al. |
| 5,818,954 A | * | 10/1998 | Tomono et al. ........... 382/115 |
| 5,912,721 A | | 6/1999 | Yamaguchi et al. |
| 6,111,580 A | * | 8/2000 | Kazama et al. ........... 715/863 |
| 6,118,888 A | * | 9/2000 | Chino et al. .............. 382/118 |
| 6,154,559 A | * | 11/2000 | Beardsley ................. 382/103 |

(Continued)

FOREIGN PATENT DOCUMENTS

| | | |
|---|---|---|
| EP | 1 484 014 A1 | 12/2004 |
| JP | 9-76815 | 3/1997 |

(Continued)

OTHER PUBLICATIONS

Patent Abstracts of Japan, Publication No. 2002-352228, dated Dec. 6, 2002, 2 pages.

(Continued)

*Primary Examiner* — Manav Seth
(74) *Attorney, Agent, or Firm* — Osha Liang LLP

(57) ABSTRACT

The present invention relates to a monitoring device, monitoring method, control device, control method, and program that use information on a face direction or gaze direction of a person to cause a device to perform processing in accordance with a movement or status of the person. A target detector 251 detects a target object. A face direction/gaze direction detector 252 detects a face direction and gaze direction of a person, determines a movement or status of the person on the basis of the relationship between the detected target object and the face direction or gaze direction of the person, and notifies face direction/gaze direction information using portions 253-1 to 253-3 of a result of the determination. The face direction/gaze direction information using portions 253-1 to 253-3 cause the device to execute predetermined processing on the basis of the result of the determination. The present invention can be applied to, for example, an on-vehicle system.

9 Claims, 21 Drawing Sheets

U.S. PATENT DOCUMENTS

| | | | |
|---|---|---|---|
| 6,198,484 B1 * | 3/2001 | Kameyama | 345/419 |
| 6,246,779 B1 * | 6/2001 | Fukui et al. | 382/103 |
| 6,373,961 B1 * | 4/2002 | Richardson et al. | 382/103 |
| 7,809,166 B2 * | 10/2010 | Funayama et al. | 382/107 |
| 7,853,051 B2 * | 12/2010 | Ota | 382/118 |
| 2004/0150514 A1 | 8/2004 | Newman et al. | |
| 2006/0056509 A1 * | 3/2006 | Suino et al. | 375/240.11 |
| 2006/0293787 A1 * | 12/2006 | Kanda et al. | 700/245 |
| 2009/0273687 A1 * | 11/2009 | Tsukizawa et al. | 348/222.1 |

FOREIGN PATENT DOCUMENTS

| | | |
|---|---|---|
| JP | 9-251342 | 9/1997 |
| JP | 2001-008197 | 1/2001 |
| JP | 2002-352228 | 12/2002 |

OTHER PUBLICATIONS

Patent Abstracts of Japan, Publication No. 2001-008197, dated Jan. 12, 2001, 1 page.

Patent Abstracts of Japan, Publication No. 09-251342, dated Sep. 22, 1997, 1 page.

Patent Abstracts of Japan, Publication No. 09-076815, dated Mar. 25, 1997, 1 page.

International Search Report issued in PCT/JP2007/055204, mailed on May 15, 2007, with translation, 3 pages.

European Search Report issued in European Application No. 07 73 8654.8, mailed on Jun. 13, 2012, with translation, 12 pages.

* cited by examiner

FIG. 14

1) ID
2) NAME
3) POSITION, SIZE AND SHAPE
4) REGISTERED DEVICE
5) LIST OF DEVICES TO BE NOTIFIED (NOTIFICATION TARGET DEVICES)
6) OUTPUT FORM
7) TIME AT WHICH TARGET OBJECT IS DETECTED
8) CONDITION OF DETERMINATION PERIOD
9) REGISTRATION DELETION CONDITION
10) DEGREE OF CAUTIOUSNESS ABOUT TARGET OBJECT
11) EXPLANATION OF TARGET OBJECT
12) DEGREE OF ATTENTION
13) RESPONSE TO STATUS
14) NOTIFICATION CONTENTS

MONITORING DEVICE, MONITORING METHOD, CONTROL DEVICE, CONTROL METHOD, AND PROGRAM

TECHNICAL FIELD

The present invention relates to a monitoring device, monitoring method, control device, control method, and program, and more particularly to a monitoring device, monitoring method, control device, control method, and program that use information on a face direction or gaze direction of a person to cause a device to perform processing in accordance with a movement or status of the person.

BACKGROUND

There has been proposed a system for detecting the direction of a gaze of a driver driving an automobile to support the driver by preventing him/her from falling asleep or driving inattentively (see Patent Document 1, for example)
Patent Document 1: Japanese Patent Laid-open Publication No. 2002-352228

However, in the system that has been conventionally proposed, the information on the direction of the face of the person or the direction of the gaze of the person was not necessarily utilized sufficiently to control the device.

DISCLOSURE OF THE INVENTION

The present invention, therefore, has been contrived in view of such circumstances, and an object of the present invention is to enable a device to perform processing in accordance with a movement or status of a person by using information on the direction of the face of a person or the direction of a gaze of the person.

A monitoring device according to a first aspect of the present invention is a monitoring device that outputs a movement or status of a person to a control device that controls a device by using the movement or status of the person, the monitoring device having: face direction detection means for detecting a face direction of the person; gaze direction detection means for detecting a gaze direction of the person; and determination means for determining a movement or status of the person on the basis of a relationship between a target object coming into view of the person and the face direction or gaze direction of the person, and outputting a result of the determination to the control device.

In the monitoring device according to the first aspect of the present invention, the face direction of the person is detected, the gaze direction of the person is detected, the movement or status of the person is determined based on a relationship between the target object coming into the view of the person and the face direction or gaze direction of the person, and the result of the determination is output to the control device. Consequently, the device can be caused to perform processing in response to the movement or status of the person on the basis of the relationship between the target object and the face direction or gaze direction.

The face direction detection means, gaze direction detection means, and determination means are constituted by, for example, a face direction detector, gaze direction detector, and CPU functioning as a determination portion, respectively.

[The monitoring device] can be further provided with registration means for registering the target object in a determination target list, and can cause the determination means to determine the movement or status of the person on the basis of the relationship between the target object registered in the determination target list and the face direction or gaze direction of the person. Consequently, the device can be caused to perform processing in response to the movement or status of the person on the basis of the relationship between the registered target object and the face direction or gaze direction.

The registration means is constituted by, for example, a CPU functioning as a target list registration portion.

For the target object, there is a dynamic target object that appears in or disappears from the view of the person as time passes, and a static target object that comes into the view of the person regardless of the passage of time, and the registration means can register, in the determination target list, the static target object for which a registration request for registering [the static target object] in the determination target list is supplied from the control device. Consequently, the device can be caused to perform processing in response to the movement or status of the person on the basis of a relationship between the static target object and the face direction or gaze direction.

The registration means can register, in the determination target list, the dynamic target object for which a registration request for registering [the dynamic target object] in the determination target list is supplied from a target object detection device that detects the dynamic target object. Consequently, the device can be caused to perform processing in response to the movement or status of the person on the basis of a relationship between the dynamic target object and the face direction or gaze direction.

This target object detection device is constituted by, for example, an imaging device, image processing device, object sensor, laser type or electric wave type radar device, laser radar device, front image monitoring device, rear image monitoring device, interior image monitoring device, or the like.

In the determination target list, at least a period for executing the determination, the control device notified of the result of the determination, and a condition for deleting the target object from the determination target list can be registered for the each target object, and the determination means can be caused to determine the movement or status of the person during the period for executing the determination, the period being registered in the determination target list.

[The monitoring device] can be further provided with face position detection means for detecting a position of the face of the person, and position converting means for converting a position of the target object into a position based on the position of the face of the person, and the determination means can be caused to determine the movement or status of the person on the basis of the relationship between the target object based on the position of the face of the person and the face direction or gaze direction of the person. Consequently, the device can be caused to perform processing in response to the movement or status of the person on the basis of the relationship between the target object based on the position of the face of the person and the face direction or gaze direction.

The face position detection means and position converting means are constituted by a face detector and CPU functioning as a face direction/gaze direction converter, respectively.

[The monitoring device] can be further provided with facial feature status detection means for detecting a status of a facial feature on the face of the person, and the determination means can be caused to determine the movement or status of the person on the basis of the status of the facial feature on the face of the person. Consequently, the device can be caused to perform processing in response to the movement or status of the person on the basis of the status of the facial feature on the face.

The facial feature status detection means is constituted by, for example, a CPU functioning as a facial feature status detector.

A control method according to the first aspect of the present invention is a monitoring method of a monitoring device that outputs a movement or status of a person to a control device that controls a device by using the movement or status of the person, the monitoring method having the steps of: detecting a face direction of the person; detecting a gaze direction of the person; and determining a movement or status of the person on the basis of a relationship between a target object coming into view of the person and the face direction or gaze direction of the person, and outputting a result of the determination to the control device.

A program according to the first aspect of the present invention is a program that causes a computer to execute processing for outputting a movement or status of a person to a control device that controls a device by using the movement or status of the person, the program having the steps of: detecting a face direction of the person; detecting a gaze direction of the person; and determining a movement or status of the person on the basis of a relationship between a target object coming into view of the person and the face direction or gaze direction of the person, and outputting a result of the determination to the control device.

In the control method and program according to the first aspect of the present invention, the face direction of the person is detected, the gaze direction of the person is detected, the movement or status of the person is determined based on a relationship between the target object coming into the view of the person and the face direction or gaze direction of the person, and the result of the determination is output to the control device. Consequently, the device can be caused to perform processing in response to the movement or status of the person on the basis of the relationship between the target object and the face direction or gaze direction.

A control device according to a second aspect of the present invention is a control device that controls a device by using a movement or status of a person that is output from a monitoring device, wherein the control device requests the monitoring device to register a part of the device as a target object coming into view of the person, in a determination target list for determining a movement or status of the person on the basis of a relationship between the target object and a face direction or gaze direction of the person, and causes the device to execute predetermined processing, by using a result of determination that is received from the monitoring device in response to the request.

In the control device according to the second aspect of the present invention, the control device requests the monitoring device to register a part of the device as a target object coming into view of a person, in a determination target list for determining a movement or status of the person on the basis of a relationship between the target object and a face direction or gaze direction of the person, and causes the device to execute predetermined processing, by using a result of determination that is received from the monitoring device in response to the request. Consequently, the device can be caused to perform processing in response to the movement or status of the person on the basis of the relationship between the target object and the face direction or gaze direction.

The control device is constituted by, for example, an overhead information presenting device, engine control device, security device, power steering control device, auto seat control device, auto mirror control device, power window control device, air conditioner control device, audio device, navigation device, sound response device, hands-free control device, and the like.

A control method according to a second aspect of the present invention is a control method of a control device that controls a device by using a movement or status of a person that is output from a monitoring device, the control method having the step of: requesting the monitoring device to register a part of the device as a target object coming into view of the person, in a determination target list for determining a movement or status of the person on the basis of a relationship between the target object and a face direction or gaze direction of the person, and causing the device to execute predetermined processing, by using a result of determination that is received from the monitoring device in response to the request.

A program according to the second aspect of the present invention is a program for causing a computer to execute control of a device by using a movement or status of a person that is output from a monitoring device, the program having the step of: requesting the monitoring device to register a part of the device as a target object coming into view of the person, in a determination target list for determining a movement or status of the person on the basis of a relationship between the target object and a face direction or gaze direction of the person, and causing the device to execute predetermined processing, by using a result of determination that is received from the monitoring device in response to the request.

In the control device and program according to the second aspect of the present invention, the monitoring device is requested to register a part of the device as a target object coming into view of a person, in a determination target list for determining a movement or status of the person on the basis of a relationship between the target object and a face direction or gaze direction of the person, and the device is caused to execute predetermined processing, by using a result of determination that is received from the monitoring device in response to the request. Consequently, the device can be caused to perform processing in response to the movement or status of the person on the basis of the relationship between the target object and the face direction or gaze direction.

According to the present invention, each device can be caused to perform processing in response to a movement or status of a person by using the information on a face direction or gaze direction of the person.

BRIEF DESCRIPTION OF THE DRAWINGS

FIG. 14 is a drawing for explaining a configuration example of attribute information of the target objects;

EXPLANATION OF REFERENCE NUMERALS

Figure 1:
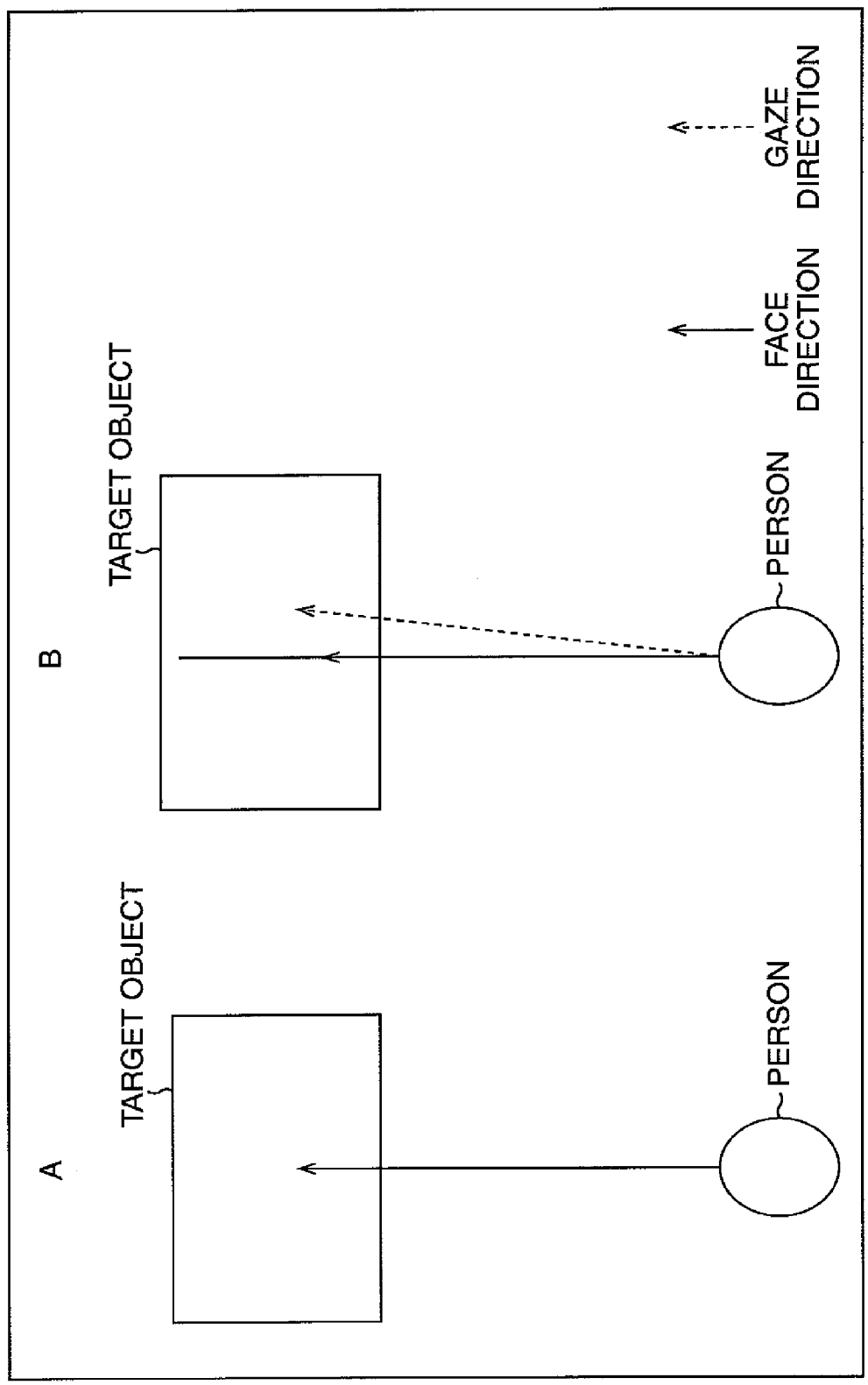
FIG. 1 is a drawing for explaining a gaze direction of a person when the person sees a target object.

1 On-vehicle system
11 Monitoring device
251 Target detector
252 Face direction/gaze direction detector
253-1 to 253-3 Face direction/gaze direction information using portions
271 Imaging portion
272 Face detector
273 Face direction detector
274 Gaze direction detector
275 Facial feature status detector
276 Target list registration portion
277 Face direction/gaze direction converter
278 Target list storage unit
279 Determination portion

BEST MODE FOR CARRYING OUT THE INVENTION

Detecting a movement or status of a person to control a device enhances the convenience in using the device. When controlling the device by using the movement or status of the person, the status of the person is determined in accordance with a target object coming into view of the person so that the device can be controlled appropriately.

The device can be controlled more appropriately by detecting the direction of the face of the person (referred to as "face direction" hereinafter) and the direction of a gaze of the person (referred to as "gaze direction" hereinafter) individually and determining the status of the person in accordance with the relationship of a target object coming into view of the person to the face direction and gaze direction, compared to the case where either the face direction or the gaze direction of the person is detected and the status of the person is determined in accordance with the relationship of the target object coming into the view of the person to the face direction or gaze direction.

The device can be controlled more appropriately by determining the status of the person in response to a change in the relationship between the face direction or gaze direction and the target object.

The device can be controlled more appropriately by determining the status of the person in response to changes in the relationship between the face direction and the target object and in the relationship between the gaze direction and the target object.

The device can be controlled more appropriately by detecting and managing predetermined target objects by means of a target detector [the detected predetermined target objects] so as to respond to a target object that appears dynamically.

Managing the target objects individually can respond to the case where the device is controlled differently according to each target object, whereby the device can be controlled more appropriately.

When the target objects coming into the view of the person change as time passes, the status of the person is determined in accordance with the target objects that are present at respective different time points to thereby control the device more appropriately.

Furthermore, the device can be controlled more appropriately by determining the status of the person in accordance with whether a detected or registered target object is a target object that should or should not be seen by the person.

Moreover, the device can be controlled more appropriately by determining the status of the person in accordance with whether the detected or registered target object is a target object to be noticed.

In addition, the device can be controlled more appropriately by determining the status of the person in accordance with the length of time in which the face direction and gaze direction are directed or not directed toward a target object.

In addition, the status of the person can be determined at appropriate timing in accordance with the relationship between the target object and the face direction or gaze direction by setting a period for performing the determination, whereby the device can be controlled more appropriately.

Furthermore, by allowing the period for performing the determination to be set for each target object, the status of the person can be determined in accordance with the relationship between the target object and the face direction or gaze direction, depending on how often the determination is made, whereby the device can be controlled more appropriately.

Moreover, the device can be controlled more appropriately by changing the degree at which [the target object] should be seen or the degree at which [the target object] should be noticed, in accordance with the status of the person or the status of the target object.

When the person directs his/her face or gaze toward a target object, the person has an interest in the target object. For example, when the person stands still in front of a painting and watches the painting in a museum, the relative relationship between the face direction or the gaze direction of the person and the painting does not change with times. In other words, the face direction of the person is directed toward the painting, which is a target object, as shown in FIG. 1A. Moreover, the gaze direction moves in order to see a part of or the entire painting, and sometimes moves in the vicinity of a region in which [the person] has an interest within the painting, as shown in FIG. 1B. This movement for seeing the target object is a basic movement in which the face direction and the gaze direction substantially coincide with the direction of the target object.

Specifically, when the person has an interest in a predetermined target object and sees [the target object], [the person] directs his/her face toward the target object and moves his/her gaze direction within a region corresponding to the target object (target object region) within his/her visual field. Therefore, the degree of interest that the person has for the target object can be found by detecting the relationship between the face direction or gaze direction and the target object (target object region).

Specifically, it is determined that the closer the face direction or the gaze direction to the direction of the target object, the higher the degree of interest in the target object. When the gaze direction substantially coincides with the direction of the target object and the face direction is directed toward a different direction from the gaze direction, it is determined that the degree of interest in the target object is low, compared to when the face direction coincides with the gaze direction (when both the face direction and the gaze direction are directed toward the target object). Note that the degree of interest may be output such that the larger the difference between the face direction and the gaze direction, the lower the value representing the degree of interest in the target object.

When the person has a strong interest in a specific target object, [the person] often observes the target object closely. Since [the person] does not look at other target objects when [the person] has a strong interest [in the abovementioned target object], the time in which [the person] observes the specific target object closely becomes long. The movement for observing the target object closely is characterized by that the gaze direction [of the person] is fixed to a certain section of the target object. When the target object moves with respect to the person, the face direction and gaze direction [of the person] change by the same amount in the same direction because [the person] follows the movement of the target object.

Specifically, when the gaze direction is directed toward the target object, which is present in the same direction, for a long time, it is clear that the person has a strong interest in the target object.

When the target object moves relatively against the person and a change in the direction of the target object is detected, and when it is detected that the face direction and gaze direction [of the person] have moved simultaneously in the same manner as the target object, it is clear that the person follows the movement of the target object.

The person has a high degree of interest in the front direction of the face direction. For this reason, when the target detector detects that the direction of seeing the target object is changed, and when both the face direction and the gaze direction change in substantially compliance with the direction of the target object, it can be determined that the degree of interest in the moving target object is high. Although [the person] has an interest in the target object when not the face direction but only the gaze direction follows the movement of the target object, it can be determined that the degree of interest is lower compared to when both the face direction and the gaze direction follow [the movement of the target object]. Moreover, when both the face direction and the gaze direction change regardless of the movement of the target object, it can be determined that the degree of interest in the target object is extremely low.

As described above, by detecting the relationship of the face direction or the gaze direction to target objects and obtaining the degree of interest in each target object, it is possible to detect and output how much the person is interested in each of the plurality of target objects.

Note that each target object can be taken as a two-dimensional target object region when seen from the person side, and it can be determined whether or not the person sees the target object, based on whether the face direction and gaze direction of the person pass through this target object region.

It requires a predetermined amount of time to recognize the target object seen by the person and understand the presence of the target object. Therefore, the time in which the target object is present in the gaze direction of the target object can be used to determine whether or not there is a possibility that the person understands the presence of the target object. Specifically, when the person does not direct his/her gaze toward the target object for at least a predetermined amount of time, it can be determined that the person does not recognize the target object, and when [the person] directs his/her gaze [toward the target object] for at least the predetermined amount of time, it can be determined that the person recognizes the target object.

Also, the precision of determination can be improved by additionally determining the face direction. The person has a high degree of interest in the front direction of the face direction. For this reason, the person has a higher interest in the target object which is present in the front direction of the face direction and toward which the person directs his/her the gaze direction, than the target object which is present in a direction different significantly from the front direction of the face direction and toward which only the person does not direct his/her face but his/her gaze. Therefore, it can be determined that the closer the gaze direction and the face direction to each other, the higher the degree in which the person recognizes the target object when he/she directs his gaze [toward the target object] for at least the predetermined amount of time.

Figure 2:
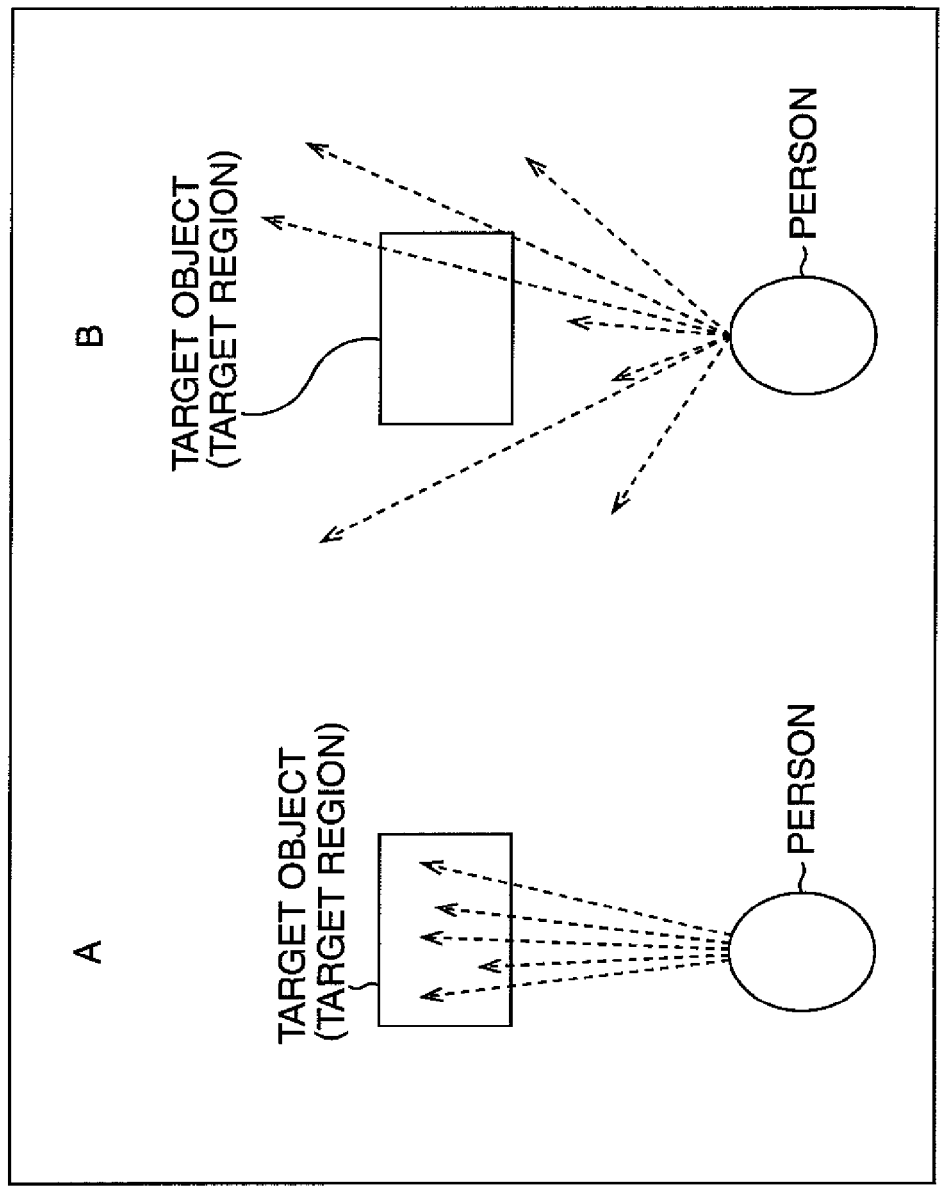
FIG. 2 is a drawing for explaining the gaze direction of the person when the person sees the target object.

Although the gaze direction of the person constantly passes through the target object region when the person sees the target object as shown in FIG. 2A, it can be determined that the person does not see the target object when the gaze direction of the person is not fixed within the target object region as shown in FIG. 2B.

When a driver sees sideways and directs his/her gaze direction toward a direction different significantly from the front direction for a long time in a vehicle traveling in a straight line, this means that the driver is driving inattentively, but a method for detecting the status of the driver by means of the face direction only cannot detect the status of the inattentive driving. However, by detecting the face direction and the gaze direction of the driver independently, it can be determined that the driver is not paying attention to the front appropriately when the gaze direction changes by straying from a predetermined range in the front direction, even when the face direction is directed to a substantially constant direction of the front direction of the vehicle.

When the driver pays attention to the front in the vehicle traveling in the straight line, the driver directs his/her face toward a substantially constant direction and directs his/her gaze toward a direction in which foregoing vehicles, road signs, white lines on the road, traffic lights, pedestrians, obstacles and the like exist. Moreover, when there is a vehicle traveling toward an intersection from the right side of an intersection having no traffic lights, the driver directs his/her gaze toward this vehicle. In a state where the gaze direction does not see only a specific direction, detecting the gaze direction only and monitoring the driver cannot accurately determine whether or not the drive appropriately sees the front. However, when both the face direction and the gaze direction of the driver are detected independently, the face direction is directed to the substantially constant direction, and the gaze direction changes within the predetermined range in the front direction, it can be determined that [the driver] pays attention appropriately to the front.

Of [the directions of] the target objects to be seen, the direction of the road on which the vehicle travels changes according to the traveling [status] of the vehicle when the road is curved. At this moment, when changing the face direction in response to a change in the direction in which [the driver] can see the road on which the vehicle travels, there is a case in which only the gaze direction is changed and a case in which the both face direction and the gaze direction are changed. When the driver sees the road in the traveling direction, this does not mean that [the driver] is driving inattentively. When the both face direction and the gaze direction of the driver are detected independently, and the face direction is directed toward the direction of the road that is the traveling direction of the vehicle or the target object to be seen, and when the gaze direction is changed within the predetermined range in the vicinity of the direction of the road that is the traveling direction of the vehicle or the target object to be seen, then it can be determined that the driver appropriately pays attention to the front.

Figure 3:
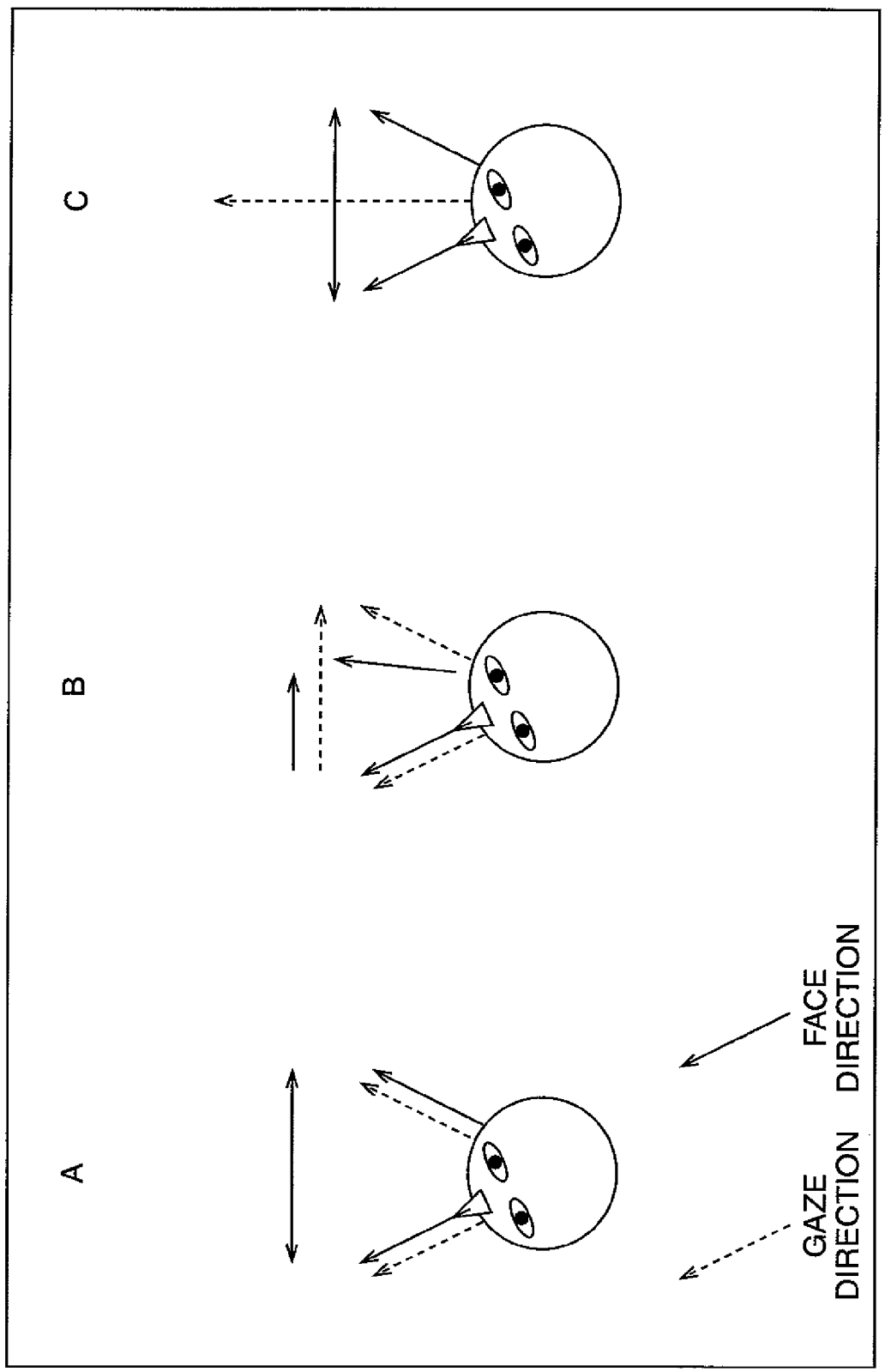
FIG. 3 is a drawing for explaining the relationship between a face direction and gaze direction of the person.

Next, the relationship between the face direction and the gaze direction of the person will now be described with reference to FIG. 3.

FIG. 3A shows a face direction and a gaze direction that are obtained when the person performs the simplest head shaking. In this case, the face direction and the gaze direction are directed toward the same way. Such a simple head shaking movement is performed unless [the person] attempts to see a target object or to express any sort of intention.

FIG. 3B shows face direction and gaze direction that are obtained when the person performs head shaking to turn around to see a target object existing to the right or left or in rear. For example, when a sound is generated in right rear, the person directs his/her head to the right to check what happens. Also, for example, when the person hears a voice of other person in right rear, finds out that he/she is familiar to this voice and tries to talk to this person, the person turns his/her head to the right. Moreover, when a sound is generated unexpectedly in rear, the person turns his/her head to the right on reflex. In this case, the gaze direction moves to the right first, and the face direction moves to the right after a delay.

FIG. 3C shows a face direction and gaze direction that are obtained when [the person] shakes his/her head to express negative intention. When the person shakes his/her head twice to express negative intention, the face direction fluctuates from side to side, but in the meantime the gaze direction does not change. In other words, the movement for seeing the target object continues.

Moreover, when the person unconsciously shakes his/her head vertically or horizontally while noticing a specific target object because other person or a device asks the person a question, not the gaze direction but the face direction changes, as shown in FIG. 3C.

In addition, for example, the person sometimes rotates or tilts his/her head when feeling stiff in the shoulders or having a sore neck. When the driver performs such movement while driving the vehicle, the face direction is changed while the gaze direction is kept directed to the front, as shown in FIG. 3C, because the gaze has to be directed toward the front. Also, at the time of cornering that induces a strong lateral acceleration while driving, changes in the face direction and in the gaze direction shown in FIG. 3C are generated also when the head is tiled to the side by an external acceleration. By providing an acceleration sensor and thereby detecting acceleration along with a face direction, it becomes possible to distinguish between whether the face direction is changed (the face moved) by the force added externally and whether the driver changes the face direction voluntarily (moves the face).

Note that the person usually sees a target object that exists in front of him/her or that is in contact with a hand of the person, and the gaze direction is focused on the vicinity of the person's eye level so that horizontal movements of the face direction and the gaze direction become significant. Therefore, when the face direction or the gaze direction of the person moves vertically, it usually means that the person is in a special status. For example, when the neck (head) is instantaneously shaken vertically, i.e., when the ace direction is instantaneously moved up and down, there is a possibility that the arousal is significantly low. In a case where the arousal of the person is slightly low, the face direction or the gaze direction does not change, in which case the status of the person can be detected in accordance with a change in an interval between blinks and in the length of time in which the eyelids are kept closed.

In addition, when the face direction or the gaze direction of the person is moved vertically, the person sometimes shakes his/her head vertically to, for example, express positive intention to a someone's question. When a sound is generated beneath the person' feet or other concern occurs, the person tilts his/her head downward to see the direction of his/her feet. Since the person should basically see the front while driving, vertical movements are particularly important in terms of safety.

As described above, movements of the face direction or the gaze direction are characterized by the relationship thereof to the direction of the target object, and a concern of the person or the movement and status of the person can be understood by knowing the relationship of the direction of the target object to the face direction and the gaze direction, i.e., the time course of the direction of the target object, the face direction and the gaze direction. Also, when a target person who detects the face direction or gaze direction is the driver of the vehicle and a target object toward which the face or gaze is directed is a road ahead or a device (equipment) of the vehicle, the device can be controlled in accordance with an understanding of a matter of interest or a movement or status of the person so that the driver is allowed to operate easily and have a safer drive.

Next is described an embodiment in which the device in a vehicle is caused to perform a predetermined operation in accordance with a face direction or gaze direction of the driver.

Figure 4:
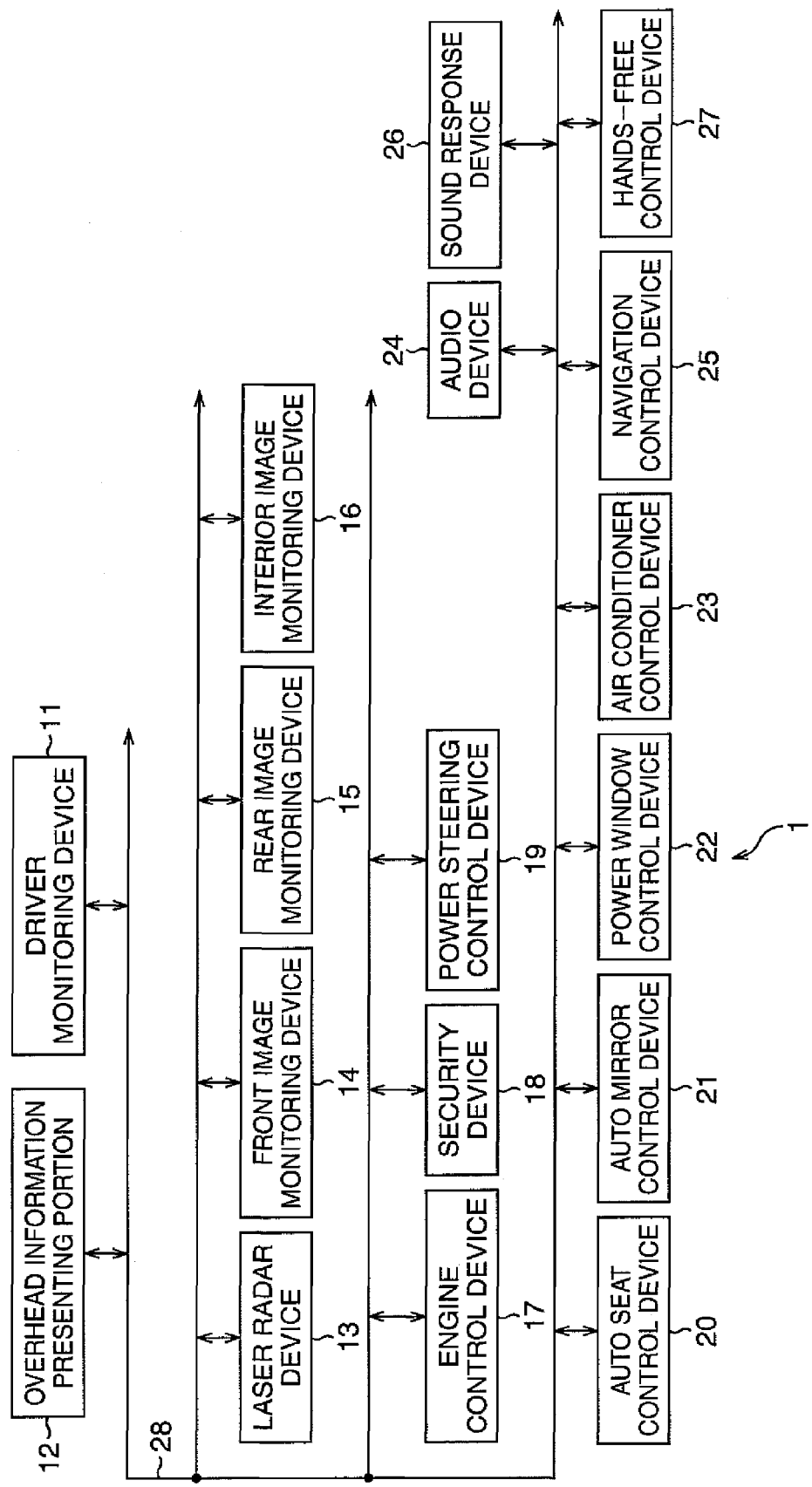
FIG. 4 is a block diagram showing a configuration example of an embodiment of an on-vehicle system to which the present invention is applied.

FIG. 4 shows a configuration example of an embodiment of an on-vehicle system to which the present invention is applied.

An on-vehicle system 1 shown in FIG. 4, which is a control device mounted in a vehicle, is constituted by a driver monitoring device 11, an overhead information presenting device 12, a laser radar device 13, a front image monitoring device 14, a rear image monitoring device 15, an interior image monitoring device 16, an engine control device 17, a security device 18, a power steering control device 19, an auto seat control device 20, an auto mirror control device 21, a power window control device 22, an air conditioner control device 23, an audio device 24, a navigation device 25, a sound response device 26, a hands-free control device 27, and an on-vehicle bus 28.

The driver monitoring device 11 captures images of a driver, detects the position of the face of the driver, and detects a face direction and gaze direction [of the driver]. Moreover, in response to a registration request that is supplied from another device connected [to the driver monitoring device 11] via the on-vehicle bus 28, the driver monitoring device 11 further registers a target object, which is recognized as a target by the driver, in an internal list. The driver monitoring device 11 then performs determination on a status or movement of the driver on the basis of the relationship of the detected face direction and gaze direction to the target object, and supplies thus obtained result of the determination to the device connected [to the driver monitoring device 11] via the on-vehicle bus 28.

The overhead information presenting device 12 provides predetermined information to the driver by projecting characters, signals, or images to a display portion provided on a windshield in front of the driver's seat. For example, the overhead information presenting device 12 displays numeric values to represent a current speed.

The laser radar device 13 radiates laser light in different directions within a predetermined measurement range and measures the time required for the laser light to be reflected back from the object, and thereby detects the target object to be detected. The front image monitoring device 14, rear image monitoring device 15, and interior image monitoring device 16 each captures images and perform image processing on the captured images to thereby detect the target object that comes into the driver's view. Here, detecting the target object means to obtain the direction and distance (directional vector) to the target object and the size (target region) of the target object. The difference among [the front image monitoring device 14, rear image monitoring device 15, and interior image monitoring device 16] is that the front image monitoring device 14 captures images of the front of the vehicle (traveling direction), the rear image monitoring device 15 captures images of the rear of the vehicle, and the interior image monitoring device 16 captures images of the interior of the vehicle. The front image monitoring device 14 detects, for example, a front vehicle (also referred to as "leading vehicle" hereinafter), a pedestrian, an obstacle or the like in front of the driver's own vehicle (also referred to as "base vehicle" hereinafter). The rear image monitoring device 15 detects, for example, a rear vehicle (also referred to as "following vehicle" hereinafter) traveling behind the base vehicle, a pedestrian, an obstacle or the like. The interior image monitoring device 16 detects, for example, a fellow passenger, a luggage, a pet, a cellular phone, or the like. It should be noted that video cameras or the like can be adopted as the front image monitoring device 14, rear image monitoring device 15, and interior image monitoring device 16 in order to detect target object more precisely.

The engine control device 17 controls the engine driving the vehicle, and notifies the driver monitoring device 11 of information on a traveling status. The security device 18 performs security management such as a door lock [operation], and notifies the driver monitoring device 11 of a security status. The power steering control device 19 controls the power steering.

The auto seat control device 20 controls an electric seat of the driver's seat and notifies the driver monitoring device 11 of seat position information, which is information on a seat position. The auto mirror control device 21 adjusts the angle of an electric mirror in accordance with the position of the face of the driver which is detected by the driver monitoring device 11, and notifies the driver monitoring device 11 of the direction (angle) of the adjusted electric mirror and the size (dimension) of the electric mirror. Accordingly, based on the position of the driver's face, the seat position information from the auto seat control device 20, and the direction and size of the electric mirror that are obtained from the auto mirror control device 21, the driver monitoring device 11 can calculate rear view in which the driver can see through the electric mirror.

The power window control device 22 controls opening and closing of a window in response to a user operation of a power window switch. The air conditioner control device 23 controls an air conditioner. The audio device 24 receives an electric wave from a radio station to output a sound or plays a CD to output a sound.

The navigation device 25, which is equipped with a GPS (Global Positioning System), displays, on an LCD or other display, an image in which a current position of the vehicle is superimposed on a map of a predetermined scale, and guides the driver through a path. The navigation device 25 further can change the angle of the display electrically and register the angle of the display that can be easily seen by the driver.

The sound response device 26 recognizes a voice command is used by the driver in the form of a sound, and supplies the voice command to a corresponding device or informs the driver of predetermined information by using a synthetic sound or a sound stored in memory.

The hands-free control device 27 is connected to the cellular phone of the driver by short-distance wireless communication such as a Bluetooth™ to exchange sound data.

The on-vehicle system 1 with the above configuration detects the face direction and gaze direction of the driver driving the vehicle, and controls a predetermined device (equipment) installed in the vehicle on the basis of the relationship between the face direction or gaze direction and the target object.

More specifically, the on-vehicle system 1 causes the predetermined device to perform a corresponding operation in response to when the driver directs his/her face or gaze toward the target object, which is an external object such as a pedestrian or an oncoming vehicle on a road. For example, when the on-vehicle system 1 detects the pedestrian in a dark front area, [the on-vehicle system 1] emphatically displays the presence of the pedestrian in front and notifies [the driver] of the presence of the pedestrian by means of a sound.

Furthermore, the on-vehicle system 1 can cause the predetermined device to perform a corresponding operation when the driver does not see the target object. When, for example, the driver does not see the front frequently or for a sufficient amount of time, the on-vehicle system 1 performs a warning operation for warning that the driver does not monitor the front sufficiently. Also, for example, when the vehicle enters the main road of an express way without seeing directions of vehicles traveling in the main road, the on-vehicle system 1 notifies and alerts [the driver] to see the directions of the vehicles traveling in the main road.

The target object that the driver sees can be classified mainly into: the driver him/herself (a hand of the driver, or the like), a component of the driven vehicle (the steering wheel, combination meter, or the like), an object in the vehicle (the cellular phone, or the like), and an object around the vehicle (a guardrail, leading vehicle, or the like).

To classify the target object that the driver sees inside or outside the vehicle, [the target object] inside the vehicle can be an object operated by the driver (the one related to driving or the one unrelated to driving), an object related to displaying (the one related to driving or the one unrelated to driving), the fellow passenger, and the luggage, while [the target object] outside the vehicle can be the road and an object therearound, a vehicle around the driver's vehicle (the leading vehicle, oncoming vehicle, following vehicle, or the like), an obstacle, and a scenery outside the road.

The target object further can be classified into a front object, rear object, lateral object and the like in relation to the driver in terms of directions from the driver's side.

Figure 5:
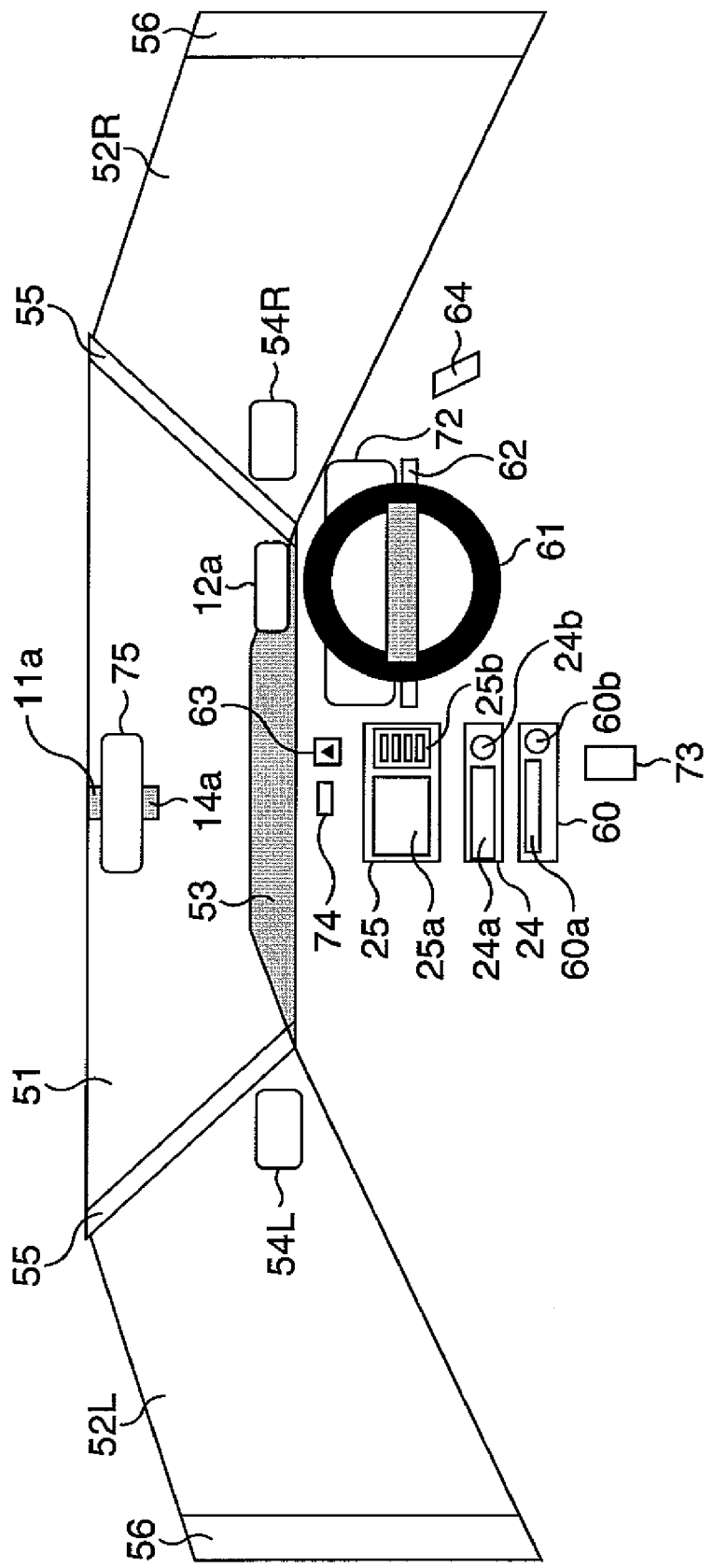
FIG. 5 is a drawing showing an example of the target object coming into view of a driver sitting in a driver's seat.

FIG. 5 shows an example of the target object coming into view of the driver sitting in the driver's seat.

When the driver sees outside the vehicle, the driver sees the target object through a windshield 51, a right front glass 52R, or a left front glass 52L. The target object outside the vehicle is a hood 53, a right side mirror 54R, or a left side mirror 54L as shown in FIG. 5. Although the driver does not consciously see an A pillar 55 or a B pillar 56, the A pillar 55 and B pillar 56 sometimes block the driver's view when the driver tries to see a pedestrian or the outside the vehicle, hence it is desired to register the A pillar 55 and B pillar 56 as the target object so that the target object outside the vehicle that is blocked by these [A pillar 55 and B pillar 56] can be inferred.

The target object inside the vehicle can be an operating portion operated by the driver and the display portion for transmitting information to the driver without being operated by the driver. Target objects included in the operating portion are an operation panel 24b of the audio device 24, an operation panel 25b of the navigation device 25, an operation panel 60b of an air conditioner device 60, a steering wheel 61, a combination switch 62 attached with light switch, windshield wiper switch, indicator switch and the like, a hazard indicator 63, a power window switch 64, and the like. Target [objects] included in the display portion are a display 24a of the audio device 24, a display 25b of the navigation device 25, a display 60a of the air conditioner device 60, a display 12a of the overhead information presenting device 12, a combination meter 72, an AT selector display portion 73, a clock 74, and a rearview mirror 75. In addition, when the cellular phone or the like is placed in the vehicle, the cellular phone is also taken as the target object. Note that a camera 11a of the driver monitoring device 11 for capturing images of the driver, and a camera 14a of the front image monitoring device 14 for capturing images of the front of the vehicle are both attached to the vicinity of the rearview mirror 75. In FIG. 5, the camera 11a of the driver monitoring device 11 is attached above the rearview mirror 75, while the camera 14a of the front image monitoring device 14 is attached below the rearview mirror 75.

Figure 6:
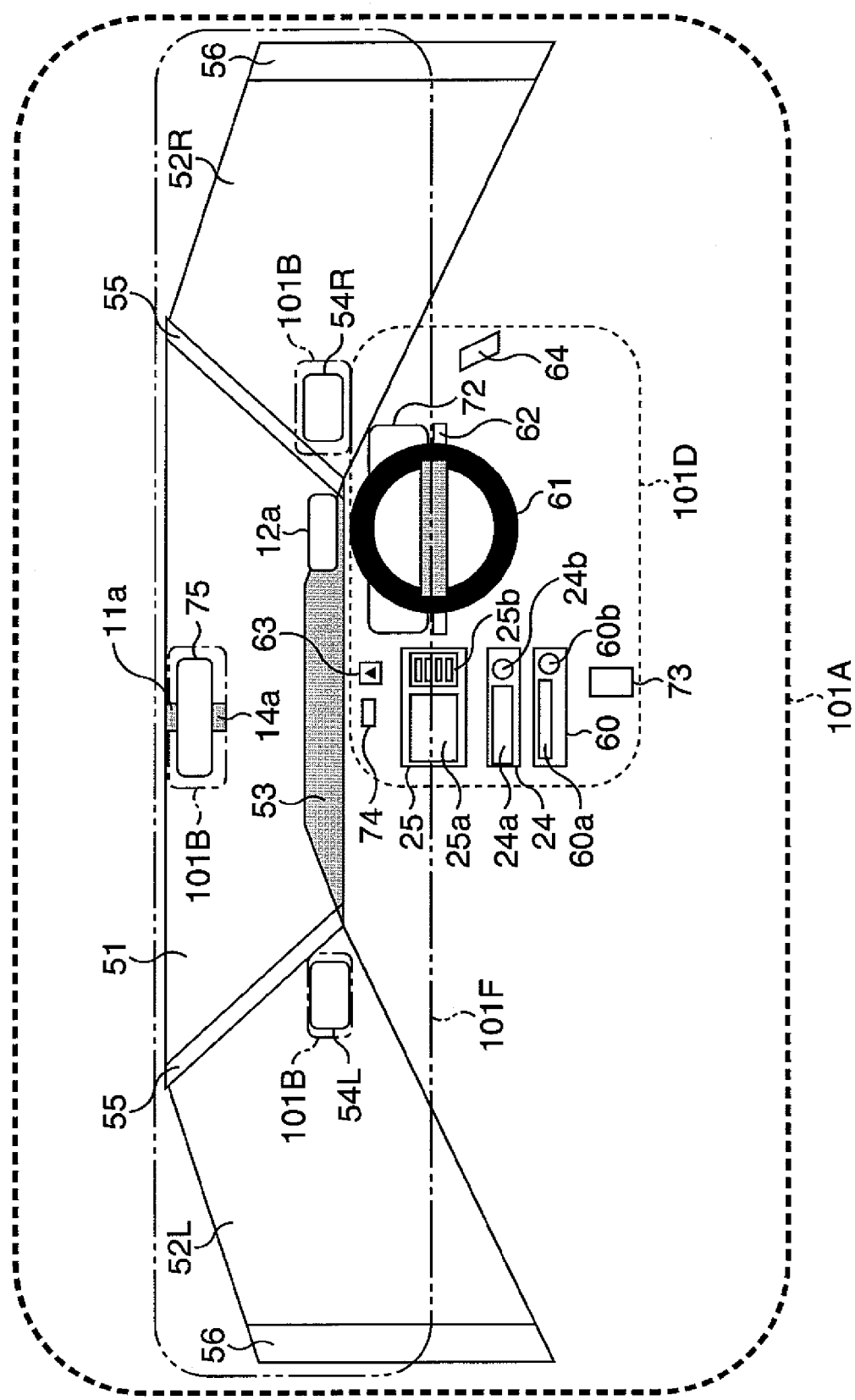
FIG. 6 is a drawing showing an example in which the target object coming into the driver's view is classified into a plurality of regions.

FIG. 6 shows an example in which the target object coming into the driver's view shown in FIG. 5 is classified into a plurality of regions.

A driver view region 101A includes all target objects coming into the driver's view. The driver view region 101A further includes a driver's seat region 101D, a rear view region 101B, and a front view region 101F. Note that the front view region 101F does not include the rear view region 101B positioned therein.

The driver's seat region 101D includes the audio device 24, navigation device 25, air conditioner device 60, steering wheel 61, combination switch 62, hazard indicator 63, power window switch 64, combination meter 72, AT selector display portion 73, clock 74 and the like as target objects.

The rear view region 101B includes the right side mirror 54R, left side mirror 54L, rearview mirror 75 and the like as the target objects.

The front view region 101F includes the display 12a of the overhead information presenting device 12, display 25b of the navigation device 25, windshield 51, right front glass 52R, left front glass 52L, hood 53, right side mirror 54R, left side mirror 54L, steering wheel 61, combination switch 62, hazard indicator 63, combination meter 72, clock 74 and the like.

Note that these target objects may be included partially in each of the driver's seat region 101D, rear view region 101B and front view region 101F.

Figure 7:
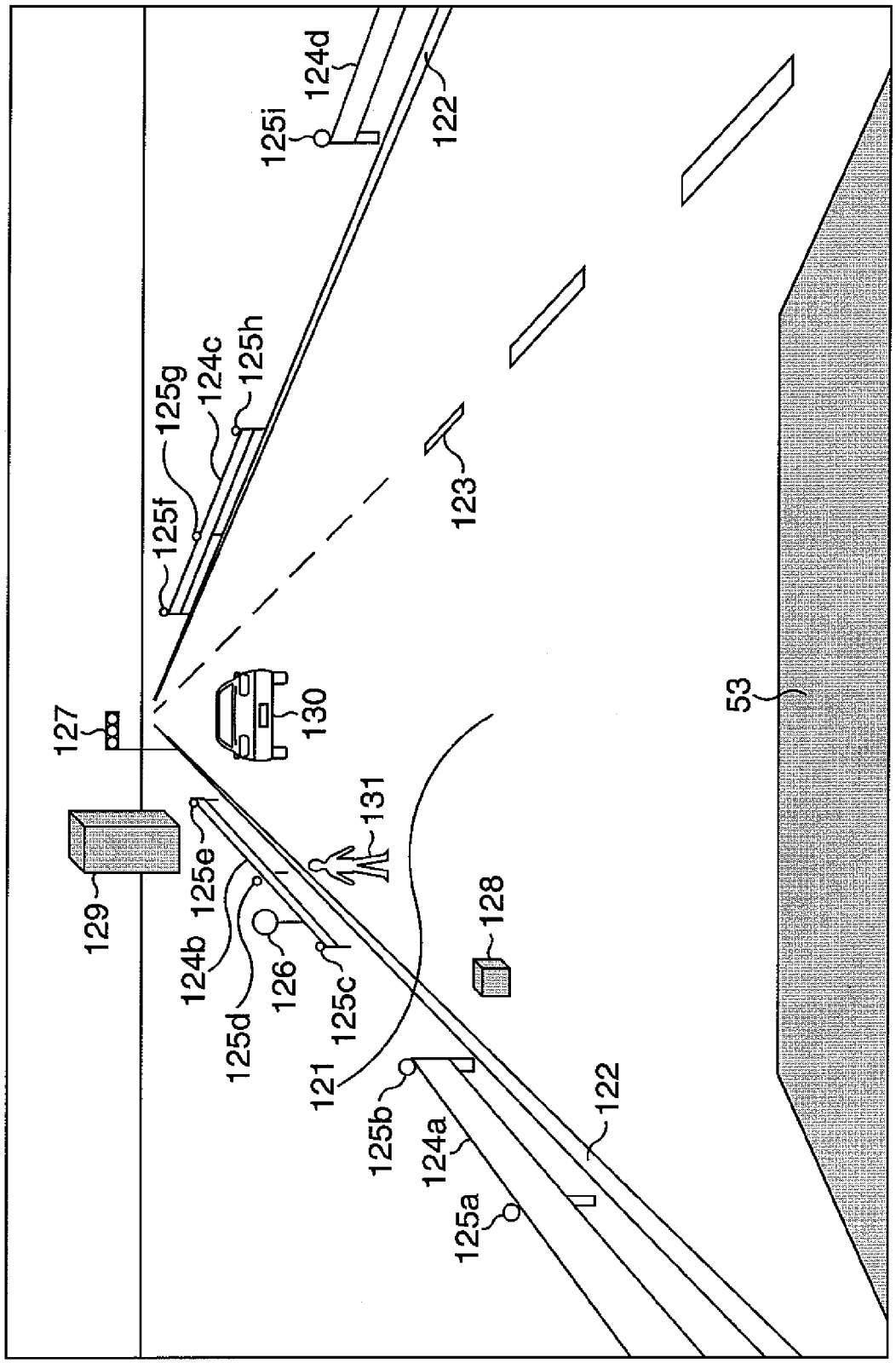
FIG. 7 is a drawing showing an example of target objects outside an automobile.

FIG. 7 shows an example of the target objects outside the vehicle, which are detected by the camera 14a of the front image monitoring device 14 attached below the rearview mirror 75.

The camera 14a of the front image monitoring device 14 detects the hood 53, a road 121, white lines 122 on side strips, center lines 123, guardrails 124a to 124d, reflectors 125a to 125i attached to the guardrails 124a to 124d, a road sign 126, a traffic light 127, a fallen object 128 on the road 121, a building 129, a leading vehicle 130, a pedestrian 131, and other target objects.

Figure 8:
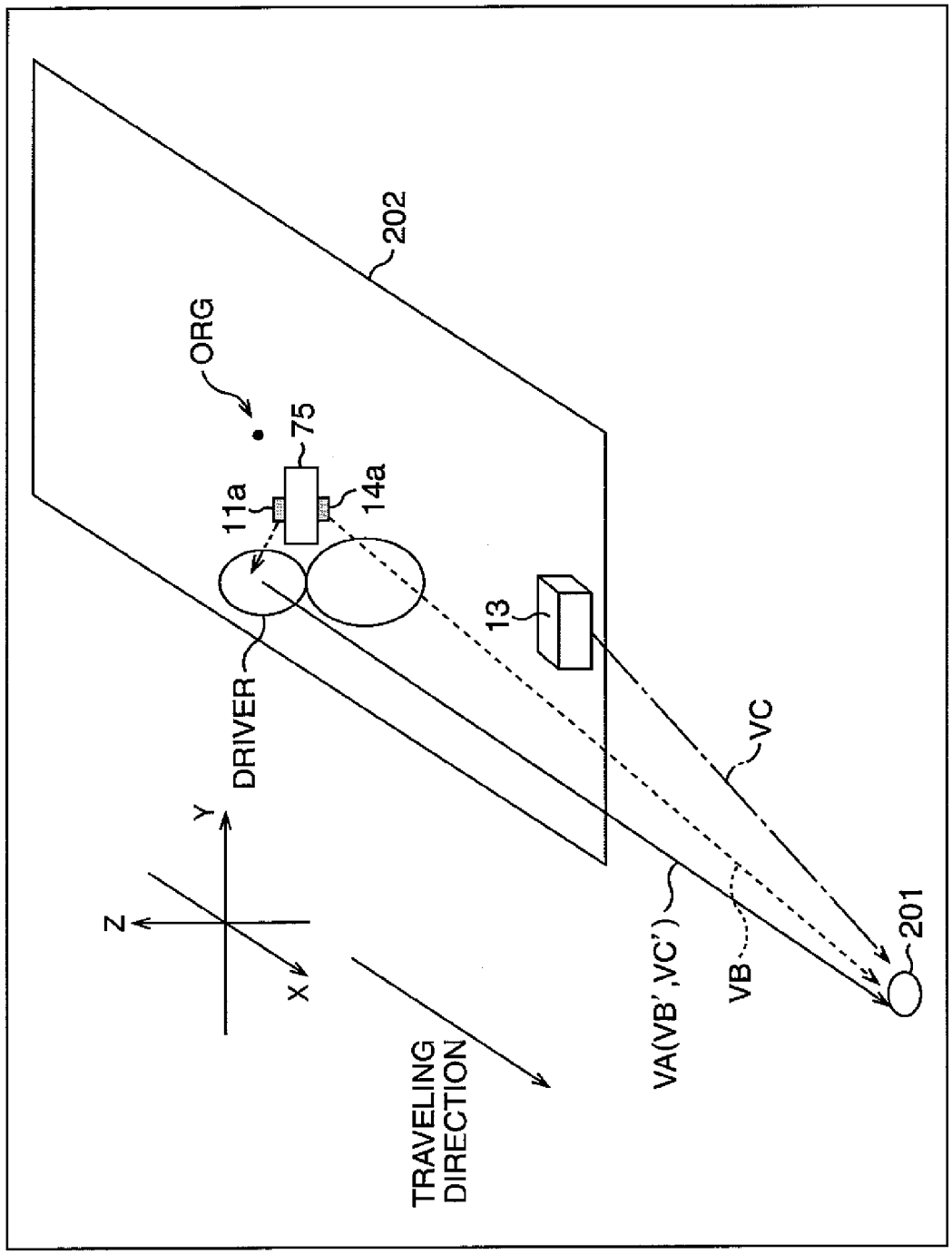
FIG. 8 is a drawing for explaining the difference between a direction of vision of the driver and a direction in which laser radar device and front image monitoring device detect [a target object]

Next, FIG. 8 is used to describe the difference between a direction of vision of the driver and a direction in which the laser radar device 13 and front image monitoring device 14 detect a target object existing in front.

As described above, the camera 14a of the front image monitoring device 14 is attached below the rearview mirror 75. Therefore, there occurs a difference between a direction in which the driver sees a target object 201 and a direction in which the front image monitoring device 14 detects the target object 201. The same can be said for the laser radar device 13 attached to a front section of a floor panel 202 of the vehicle body.

Specifically, the driver recognizes that the front target object 201 exists in a directional vector VA shown as a solid arrow. The driver monitoring device 11 detects the directional vector VA, which is a gaze direction of the driver, from an image captured by the camera 11a attached above the rearview mirror 75.

On the other hand, the camera 14a of the front image monitoring device 14 attached below the rearview mirror 75 recognizes that the target object 201 exists in a directional vector VB shown as a dotted arrow. Also, the laser radar device 13 attached to a front central section of the floor panel 202 of the vehicle body recognizes that the target object 201 exists in a directional vector VC shown as a dashed-dotted arrow.

The difference among the directions of the directional vectors VA, VB and VC in FIG. 8 occurs due to the difference in positions of the driver's face, laser radar device 13, and front image monitoring device 14. However, because the directional vectors VA, VB and VC are directed toward the same target object 201, the driver monitoring device 11 should determine that the driver sees the target objects 201 that are detected by the laser radar device 13 and front image monitoring device 14.

Here, the driver monitoring device 11 registers the positions of the driver monitoring device 11, laser radar device 13 and front image monitoring device 14 in the form of an orthogonal coordinate system (referred to as "vehicle reference frame" appropriately) in which the center ORG of the floor panel 202 is taken as the origin, across direction as an X-axis, a horizontal direction as a Y-axis, and a vertical direction as a Z-axis. [The driver monitoring device 11] then converts the directional vector VB in which the front image monitoring device 14 detects the target object 201 and the directional vector VC in which the laser radar device 13 detects the target object 201 into a directional vector VB' and a directional vector VC', respectively, based on the position of the driver's face. Consequently, the directional vector VA is matched to the directional vectors VB' and VC' and it becomes possible to determine that the driver sees the target object 201.

The origin of the orthogonal coordinate system can be set to a thing other than the abovementioned center of the floor panel 202 of the vehicle body, but it is preferred that [the origin of the orthogonal coordinate system] be set to, not a certain point on the earth, but somewhere on the vehicle body in which the positions of the driver monitoring device 11, laser radar device 13 and front image monitoring device 14 are fixed, in order to reduce the calculation processing amount.

Figure 9:
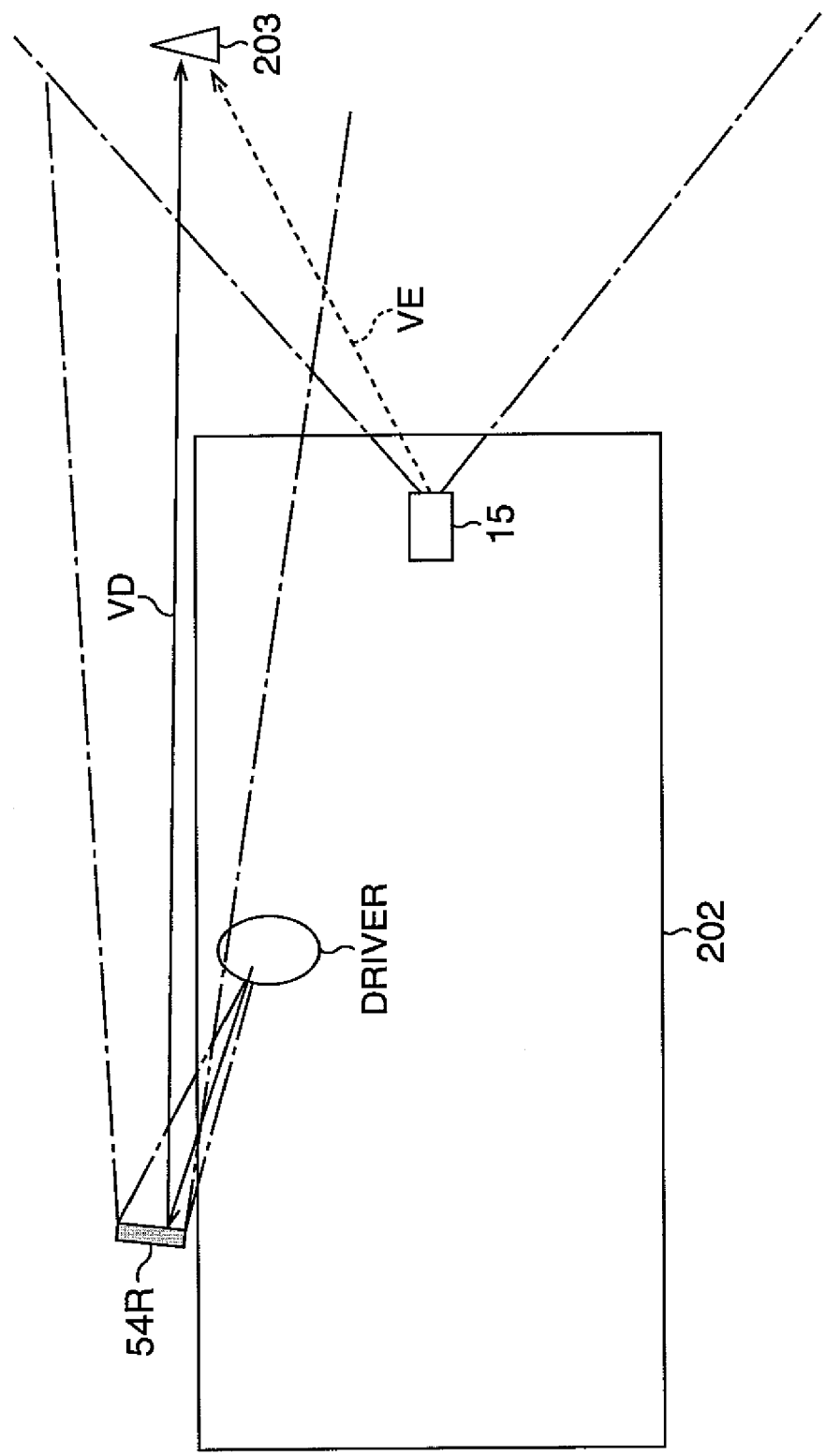
FIG. 9 is a drawing for explaining the difference between a direction of vision of the driver and [a direction] in which a rear image monitoring device detects [the target object]

Moreover, as shown in FIG. 9, when the driver sees a rear target object 203 through the right side mirror 54R, the gaze direction of the driver is shown as the solid arrow direction VD. On the other hand, the rear image monitoring device 15 attached to a rear central section of the floor panel 202 of the vehicle body recognizes the target object 203 as a direction VE shown as a dotted arrow.

In this case as well, the direction VE in which the rear image monitoring device IS detects the target object 203 is converted into a direction based on the position of the driver's face, whereby it can be determined that the driver sees the target object 203. Note that because the gaze direction VD of the driver is reflected by the right side mirror 54R, calculation processing, such as reflexing the position of the driver on the basis of the reflecting surface, needs to be performed.

Figure 10:
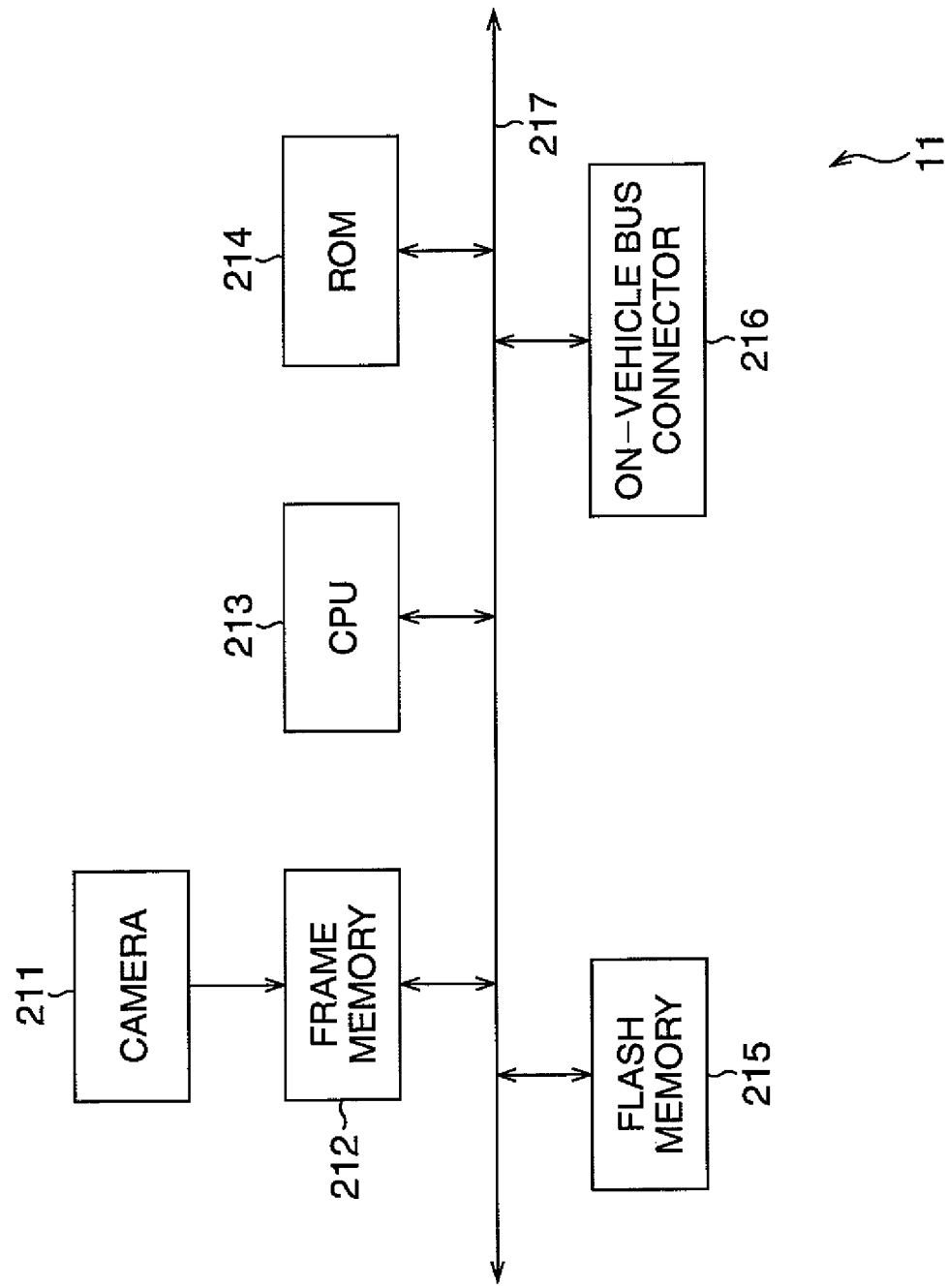
FIG. 10 is a block diagram showing a hardware configuration example of a driver monitoring device.

FIG. 10 is a block diagram showing a hardware configuration example of the driver monitoring device 11.

The driver monitoring device 11 is constituted by a camera 211, frame memory 212, CPU (Central Processing Unit) 213, ROM (Read Only Memory) 214, flash memory 215, on-vehicle bus connector 216, and internal bus 217.

The camera 211, which is constituted by a CCD (Charge Coupled Device) sensor, CMOS (Complementary Mental Oxide Semiconductor) sensor and other imaging sensor, captures images of the driver and supplies the captured images of the driver to the frame memory 212. Note that the camera 211 may be constituted by two imaging sensors so as to be able to detect distances and directions more precisely, as described above.

The frame memory 212 stores data of the images captures by the camera 211 and supplies [the data] to the CPU 213, flash memory 215, on-vehicle bus connector 216 and the like according to need.

The CPU 213 performs predetermined processing, or in other words processing for detecting the face direction and gaze direction of the driver from the images supplied by the frame memory 212, in accordance with a program stored in the ROM 214.

The ROM 214 stores a program executed by the CPU 213 and initial data or the like required for the execution of the program. The flash memory 215 appropriately stores data that are required to be saved temporarily when executing the program and data that are required to be stored even after power-off.

The on-vehicle bus connector 216 is connected to the on-vehicle bus 28 to exchange data with the CPU 213, frame memory 212, or each of the devices preceding the on-vehicle bus 28. The internal bus 217 relays the data exchanged among the frame memory 212, CPU 213, ROM 214, flash memory 215 and on-vehicle bus connector 216 that are connected to [the internal bus 217].

Figure 11:
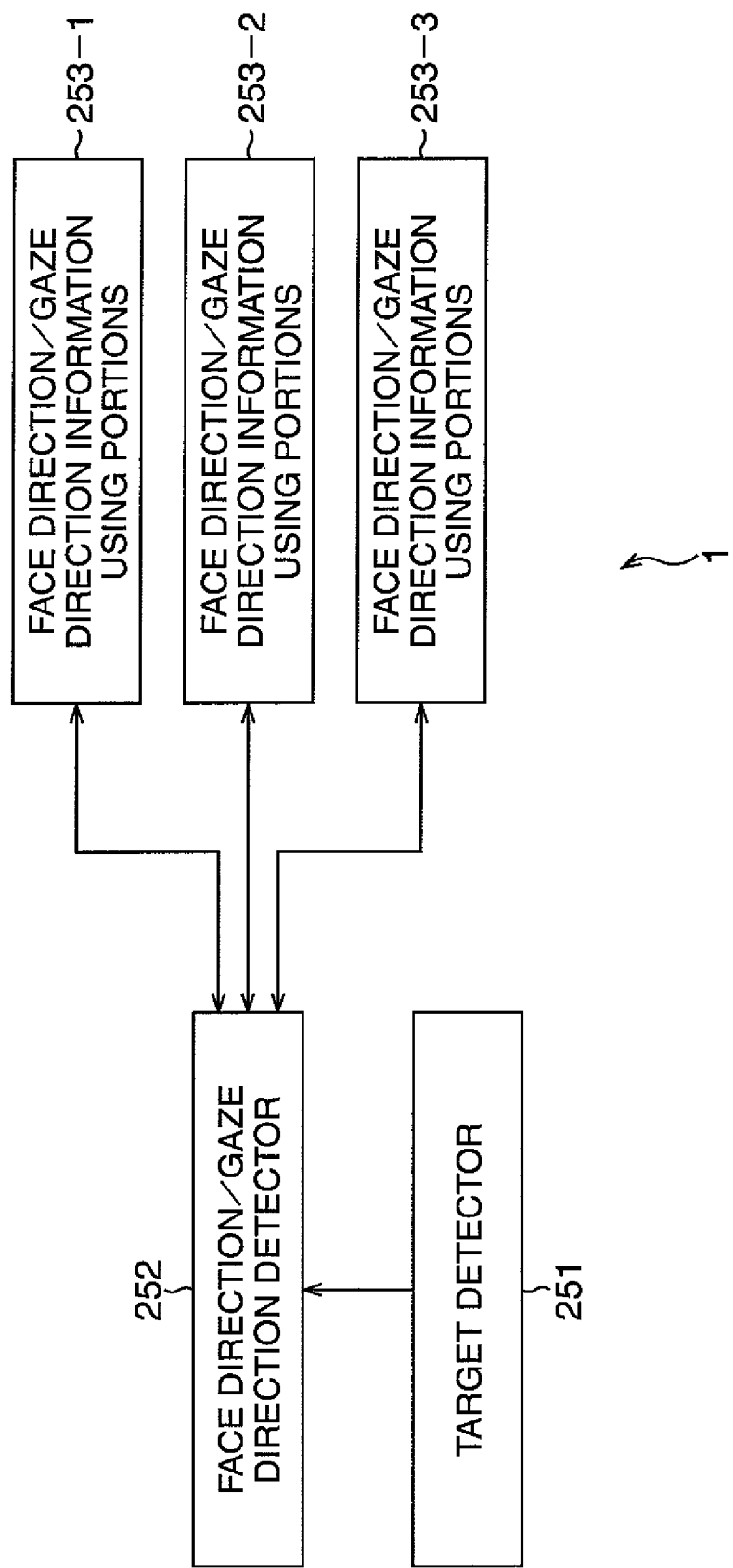
FIG. 11 is a functional block diagram illustrating a functional configuration of the on-vehicle system.

FIG. 11 is a functional block diagram illustrating a functional configuration of the on-vehicle system 1 shown in FIG. 4.

The on-vehicle system 1 is constituted functionally by a target detector 251, face direction/gaze direction detector 252, and face direction/gaze direction information using portions 253-1 to 253-3.

The target detector 251 detects a dynamic target object out of target objects to be viewed by the driver. The dynamic target object is, for example, an oncoming vehicle or pedestrian appearing in front of the vehicle, or other target object that comes into or disappears from the driver's view as time passes. Note that, in addition to the dynamic target object, the target objects include static target objects that come into the driver's view regardless of the passage of time.

The target detector 251 supplies a registration request regarding a detected target object to the face direction/gaze direction detector 252. The registration request is a command for requesting to register a target object in a determination target list that is used for determining the relationship of the target object to the face direction and gaze direction. Note that when supplying the registration request regarding the target object, the target detector 251 supplies attribute information of this target object to the face direction/gaze direction detector 252. The attribute information of the target object include an ID for identifying the target object, the position (direction) and size (region) of the target object, and the like. The same ID is applied to the same target object that is continuously detected for a certain amount of time. Therefore, for example, even when several leading vehicles are detected, they can be discriminated and identified. Note that the target detector 251 can be provided with a communication function and caused to perform registration request regarding a target object detected by other external device.

The target detector 251 is constituted by, for example, an imaging device, image processing device, object sensor, laser type or electric wave type radar device, and the like, and corresponds to the laser radar device 13, front image monitoring device 14, rear image monitoring device 15, and interior image monitoring device 16 that are shown in FIG. 4.

The face direction/gaze direction detector 252 is supplied with the registration request regarding the dynamic target object from the target detector 251 and the registration requests of the static target objects from the face direction/gaze direction information using portions 253-1 to 253-3, along with the attribute information [of these target objects].

The face direction/gaze direction detector 252 detects the face direction and gaze direction of the driver, determines the relationship of the target object, whose registration request is supplied, to the face direction or gaze direction of the driver, and supplies a result of the determination to (any of) the face direction/gaze direction information using portions 253-1 to 253-3. Note that which one of the face direction/gaze direction information using portions 253-1 to 253-3 to supply the result of the determination is set in the attribute information of the target object ([the detail] will be described hereinafter with reference to FIG. 14). The face direction/gaze direction detector 252 corresponds to the driver monitoring device 11 shown in FIG. 4.

The face direction/gaze direction information using portion 253 (each of 253-1 to 253-3) corresponds to the overhead information presenting device 12, engine control device 17, security device 18, power steering control device 19, auto seat control device 20, auto mirror control device 21, power window control device 22, air conditioner control device 23, audio device 24, navigation device 25, sound response device 26, and hands-free control device 27 in FIG. 4.

The face direction/gaze direction information using portion 253 supplies the registration request regarding a static target object, which is the operation panel or other predetermined region of the driver, to the face direction/gaze direction detector 252.

The face direction/gaze direction information using portion 253 is caused to perform a predetermined operation based on the result of the determination supplied from the face direction/gaze direction detector 252.

For example, when the face direction/gaze direction information using portion 253 is the power window control device 22, the power window control device 22 performs registration request regarding the power window switch taken as the target object. Then, as a result of determination, when notified by the face direction/gaze direction detector 252 (serving as the driver monitoring device 11) of the fact that the driver sees the power window switch, the power window control device 22 performs a predetermined operation, such as lighting the power window switch.

Moreover, when, for example, the face direction/gaze direction information using portion 253 is the air conditioner control device 23, the air conditioner control device 23 performs registration request regarding the operation panel thereof taken as the target object. Then, as a result of determination, when notified of the fact that the driver sees the operation panel of the air conditioner control device 23 while the vehicle is stopped, the air conditioner control device 23 performs a predetermined operation, such as brightening the lighting of an interior light or the operation panel of the air conditioner. In this manner, the driver can operate the air conditioner easily.

When, for example, the face direction/gaze direction information using portion 253 is the audio device 24, the audio device 24 performs registration request regarding the operation panel thereof taken as the target object. Then, as a result of determination, when notified of the fact the driver sees the operation panel of the audio device 24 while the vehicle is stopped, the audio device 24 performs a predetermined operation, such as displaying detailed information of a played content on the display. Here, when the audio device 24 is a radio for receiving an electric wave from a radio station to output a sound, the detailed information of the content means the name of the selected radio station, and when the audio device 24 is a CD player, [the detailed information of the content] means the track number, song title, artist name and the like of a played track.

When, for example, the face direction/gaze direction information using portion 253 is the navigation device 25, the navigation device 25 performs registration request regarding the operation panel thereof taken as the target object. Then, as a result of determination, when notified of the fact that the driver sees the operation panel of the navigation device 25 while the vehicle is stopped, the navigation device 25 performs a predetermined operation, such as scrolling a map, setting the position of a destination, selecting an item, or the like. Moreover, when notified of a determination result explaining that the driver observes the display of the navigation device 25 for a long time while traveling, the navigation device 25 may output a warning beep or delete a displayed [matter].

When, for example, the face direction/gaze direction information using portion 253 is the hands-free control device 27, the hands-free control device 27 performs registration request regarding the cellular phone, which is taken as the target object connected [to the hands-free control device 27] by short-distance wireless communication. Then, as a result of determination, when notified of the fact that the driver sees the cellular phone, the hands-free control device 27 performs a predetermined operation, such as bringing the cellular phone into an uncommunicable or inoperable status (drive mode or the like).

When, for example, the face direction/gaze direction information using portion 253 is the sound response device 26, the sound response device 26 detects a characteristic sound to which a person reacts, such as a sudden sound or an ambulance siren, obtains the direction of the sound, and performs registration request regarding the source of the sound, which is taken as the target object. Then, as a result of determination, when notified of the fact that the driver sees the source of the sound, the sound response device 26 performs a predetermined operation, such as generating warming beep for [advising not to] drive inattentively.

Furthermore, the face direction/gaze direction information using portion 253 can supply its own control information to the face direction/gaze direction detector 252 according to need. For example, the auto mirror control device 21 serving as the face direction/gaze direction information using portion 253 notifies the face direction/gaze direction detector 252 of information on the direction (angle) and size (dimension) of the adjusted electric mirror.

Note in FIG. 11 that the on-vehicle system 1 has the three face direction/gaze direction information using portions 253-1 to 253-3, but one, two, or at least four of the face direction/gaze direction information using portions 253 may be provided. Alternatively, the number of face direction/gaze direction information using portions 253 may be increased or decreased optimally at the bottom of the drawing, in accordance with the status of the on-vehicle system 1.

Figure 12:
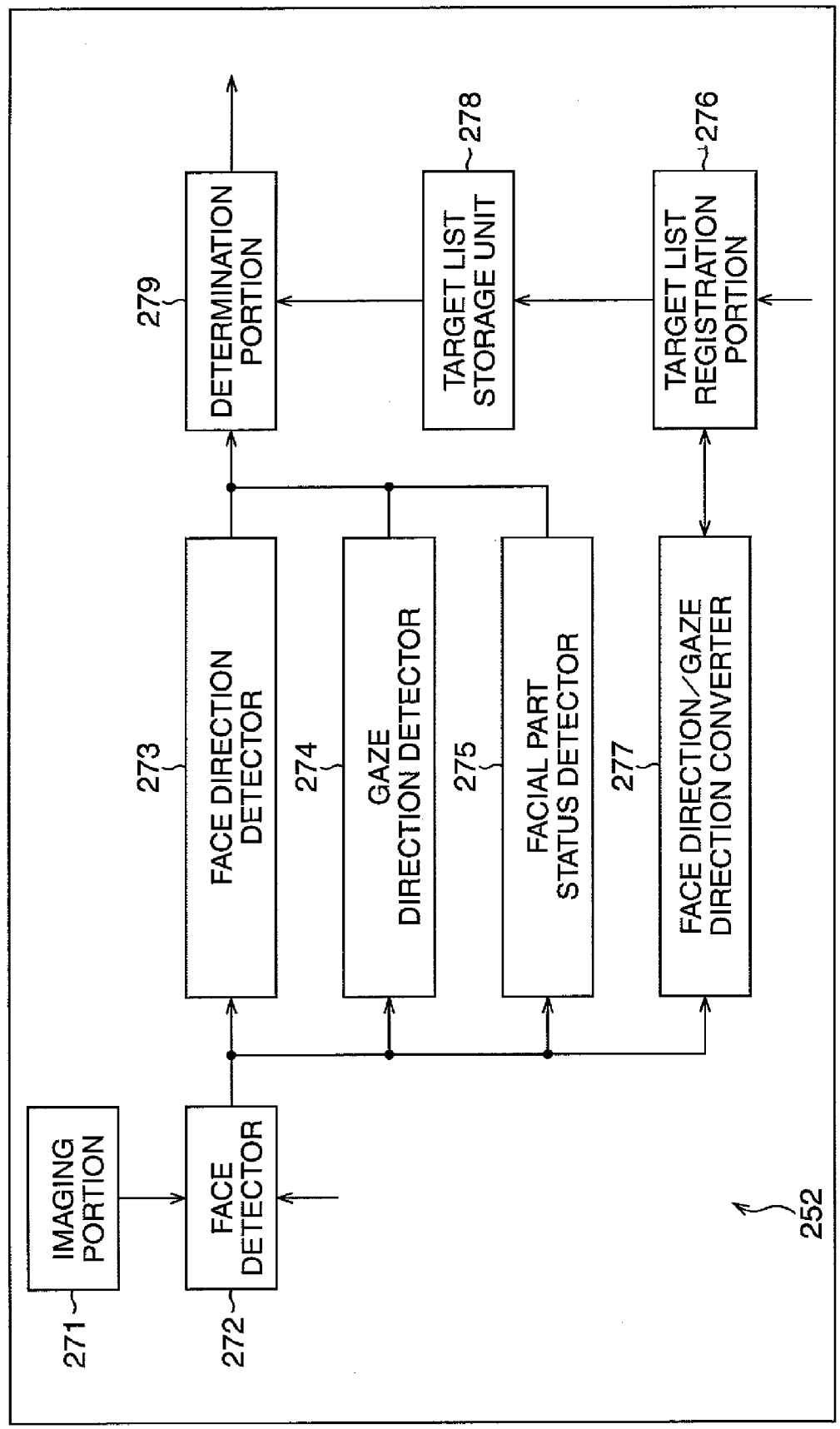
FIG. 12 is a block diagram showing a detailed configuration example of a face direction/gaze direction detector.

FIG. 12 is a block diagram showing a detailed configuration example of the face direction/gaze direction detector 252 in FIG. 11.

The face direction/gaze direction detector 252 is constituted by an imaging portion 271, face detector 272, face direction detector 273, gaze direction detector 274, facial feature status detector 275, target list registration portion 276, face direction/gaze direction converter 277, target list storage unit 278, and determination portion 279.

The imaging portion 271 captures an image of the driver as a subject, and supplies the resultant image (signal) to the face detector 272.

The face detector 272 detects a region of the driver's face from the image supplied by the imaging portion 271, and supplies an image of the detected face region (referred to as "face image" hereinafter appropriately) to the face direction detector 273, gaze direction detector 274, and facial feature status detector 275.

The face detector 272 further detects the position of the driver's face on the basis of the image of the driver supplied by the imaging portion 271 and the control information of the face direction/gaze direction information using portion 253, and supplies a result of the detection as face position information to the face direction detector 273, gaze direction detector 274, facial feature status detector 275, and face direction/gaze direction converter 277. Specifically, the face detector 272 detects the position of the driver's face on the basis of the image of the driver supplied by the imaging portion 271, the seat position information supplied by the auto seat control device 20 serving as the face direction/gaze direction information using portion 253, and the direction and size of the electric mirror that are supplied by the auto mirror control device 21 serving as the face direction/gaze direction information using portion 253. Thus obtained position of the driver's face is obtained as a coordinate in the vehicle reference frame.

The face direction detector 273 detects the face direction of the driver from the face image of the driver that is supplied by the face detector 272, and supplies a result of detection as face direction information to the determination portion 279. The gaze direction detector 274 detects the gaze direction of the driver from the face image of the driver that is supplied by the face detector 272, and supplies a result of detection as gaze direction information to the determination portion 279.

Thus obtained face direction and gaze direction of the driver are obtained as an angle between the position of the driver's face taken as a starting point, and the X-axis, Y-axis or Z-axis in the vehicle reference frame.

The facial feature status detector 275 detects the facial features of the driver's face, such as the eyes, nose, mouth, eyebrows and ears, from the face image of the driver that is supplied by the face detector 272, and supplies a result of detection as facial feature information to the determination portion 279. The facial feature information include not only information on the positions of the eyes, noise, mouth, eyebrows and ears, but also blinking and yawning of the driver.

The target list registration portion 276 is supplied with not only the registration request regarding the dynamic target object from the target detector 251 (FIG. 11), but also the registration request regarding the static target object from the gaze direction information using portion 253 (FIG. 11). Note that when the registration request regarding a target object is supplied as described above, the attribute information of the target object (also referred to as "target information" hereinafter appropriately) is also supplied at the same time.

The target list registration portion 276 supplies, to the face direction/gaze direction converter 277, the position of a target object, which is contained in the attribute information of the target object for which the registration request is supplied, and converts the position of the target object into the position based on the position of the driver's face. The target list registration portion 276 acquires the converted position of the target object from the face direction/gaze direction converter 277, supplies the target information containing the converted position to the target list storage unit 278, and thereby registers the target object in the determination target list.

For example, when the engine of the vehicle starts, the registration requests of the power window switch 64, operation panel 60b of the air conditioner device 60, or other static target object is supplied from the face direction/gaze direction information using portion 253 (FIG. 11) to the target list registration portion 276. The target list registration portion 276 registers the attribute information of the power window switch 64 or the operation panel 60b of the air conditioner device 60 in the determination target list of the target list storage unit 278. Also, for example, the navigation device 25 requests for registration of the operation panel 25b of the display 25a into the target list registration portion 276. The navigation device 25 further requests for registration of a figure or the operation switch displayed on the display 25a into the target list registration portion 276. The audio device 24 requests for registration of the display 24a and the operation panel 24b into the target list registration portion 276. The air conditioner device 60 requests for registration of the display 60a and the operation panel 60b into the target list registration portion 276. The power steering control device 19 requests for registration of the steering wheel 61, combination switch 62, combination meter 72 and the like. The front image monitoring device 14 requests for registration of the side mirrors 54R and 54L, rearview mirror 75, A pillar 55 blocking the gaze of the operator, and the like.

Note that because the position of the static target object is determined when assembly the devices in a shop or attaching the devices at a dealer, [the devices] can be registered in the determination target list in advance after shop assembly or attachment at the dealer. The target object that are required to be detected by the face direction/gaze direction information using portion 253 are registered in the determination target list, whereby [the on-vehicle system 1] can cope flexibly with the increase or decrease of the face direction/gaze direction information using portions 253.

Moreover, examples of the dynamic target object which is subjected to registration request by the target detector 251 include a pedestrian and obstacle. In addition, for example, the front image monitoring device 14 requests for registration of an oncoming vehicle, road sign, traffic signal, object existing on or around a road, background such as the sky, cross walk, traffic lane in which the vehicle travels, road region of an oncoming traffic lane, a bicycle, and the like. The rear image monitoring device 15 requests for registration of a vehicle traveling behind, and an obstacle around the base vehicle that is seen when driving backward. The interior image monitoring device 16 requests for registration of people including the driver and fellow passenger, animals such as a pet, bags, luggage, a stuffed animal, a cellular phone or other luggage mounted in the vehicle, seats, components of the vehicle such as seatbelts, smoke generated in the vehicle, and targets that can be detected by performing image processing.

A request for deletion of the dynamically detected target object is supplied from the target detector 251 when no more [dynamic target objects] are detected, and the target list registration portion 276 deletes, from the determination target list of the target list storage unit 278, the attribute information of the target object that is requested to be deleted. The target list registration portion 276 further refers to a registration deletion condition contained in the attribute information, and deletes, from the determination target list of the target list storage unit 278, a target object satisfying conditions for registration deletion that are described in [the registration deletion condition].

The face direction/gaze direction converter 277 is supplied with the position information on the position of the driver's face from the face detector 272. The face direction/gaze direction converter 277 further has stored therein the position of the target detector 251 in the vehicle reference frame, or in other words each of attachment positions for the laser radar device 13, front image monitoring device 14, rear image monitoring device 15, and interior image monitoring device 16. Therefore, when the position of the driver's face is supplied to the face direction/gaze direction converter 277, the position of the target detector 251 based on the position of the driver's face is obtained as a vector. Thus obtained vector is referred to as a target detection device vector.

The face direction/gaze direction converter 277 converts the position of the target object in the vehicle reference frame, which is supplied by the target list registration portion 276, into the position based on the position of the driver's face. Note that the position based on the position of the driver's face can be obtained by subtracting the target detection device vector from the vector of the supplied target object position.

The target list storage unit 278 stores the target information supplied by the target list registration portion 276 in the form of a data structure of a link list, as will be described hereinafter with reference to FIG. 13. The target information that is stored in the form of a data structure of a link list is the determination target list.

The determination portion 279 performs various determination on the target object registered in the determination target list, on the basis of the face direction, gaze direction and facial feature information of the driver that are supplied, respectively, by the face direction detector 273, gaze direction detector 274, and facial feature status detector 275, and then notifies the face direction/gaze direction information using portion 253 of thus obtained result of determination. For example, the determination portion 279 determines whether or not the driver sees the power window switch 64, on the basis of the position of the power window switch 64 registered as the target object, as well as the face direction and gaze direction of the driver, and then notifies the power window control device 22 serving as the face direction/gaze direction information using portion 253 of a result of the determination.

Figure 13:
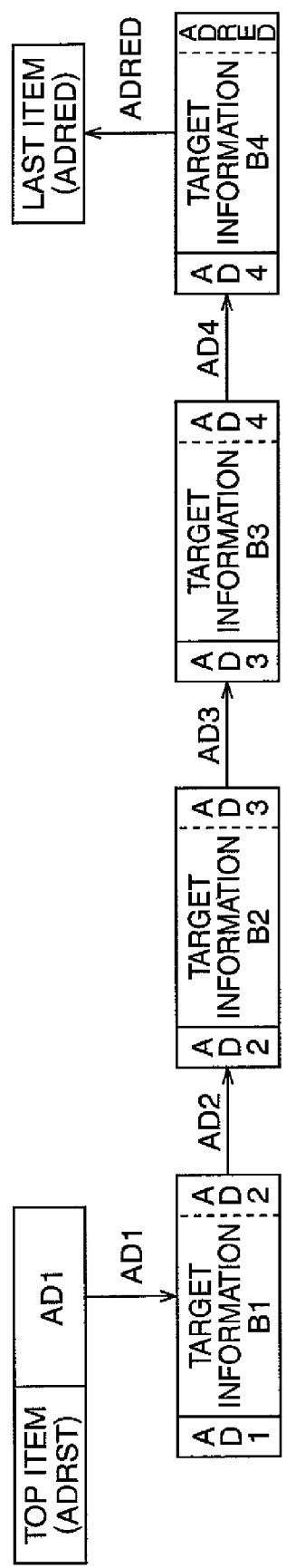
FIG. 13 is a drawing for explaining a link list, which is a data structure for storing a list of target objects in a target list storage unit.

Next, FIG. 13 is used to explain the link list, which is a data structure for storing a list of target objects in the target list storage unit 278.

The determination target list has a function of storing information on the target objects. The information on the target objects can be read from the determination target list. Although an example is described hereinafter, the configuration of the determination target list is not limited to the configuration described hereinafter. [The determination target list] may be configured such that the information on the target objects are stored and read.

Of the items to be referred to, an address ADRST of a top item and an address ADRED of a last item are determined beforehand in the target list storage unit 278.

Then, an address AD1, which is a position where first target information B1 is stored, is stored in the position of the address ADRST, the top item. Furthermore, an address AD2, which is a position in which the first target information B1 and second target information B2 are stored, is stored in the position of the address AD1 where the first target information B1 is stored. Similarly, the target information B2 and an address AD3 are stored in the position of the address AD2, and target information B3 and an address AD4 are stored in the position of the address AD3. Then, target information B4 and the address ADRED of the last item are stored in the position of the address AD4.

Moreover, for example, when new target information B5 is stored in the target list storage unit 278, an address having the target information B5 stored therein is stored next to the target object information B4 of the position of the address AD4, in place of the address ADRED. When the address having the target information B5 stored therein is set as an AD5, the address ADRED of the last item is stored in the position of the address AD5 in which the target information B5 is stored.

Therefore, the determination portion 279 that refers to the target list storage unit 278 successively refers to the top item through the last item for the positions of the addresses, so as to be able to confirm the registered target information.

FIG. 14 shows a configuration example of the target information (attribute information of the target objects).

As shown in FIG. 14, the target information consists of fourteen items: 1) ID, 2) name, 3) position, size and shape, 4) registered device, 5) list of devices to be notified, 6) output form, 7) time at which target object is detected, 8) condition of determination period, 9) registration deletion condition, 10) degree of cautiousness about target object, 11) explanation of target object, 12) degree of attention, 13) response to status and 14) notification contents. Note that not all of the items have to be described, hence unnecessary items can be omitted. Each of the items will now be described hereinafter.

1) ID

This item describes an ID for identifying target information registered in the target list storage unit 278.

2) Name

This item describes the name of a target object. The name may be a personal name or other unique name, the type of vehicle, or a class name of a dog or cat. Furthermore, the name may a descriptive expression, such as "pedestrian in front" or "no parking sign." The name also may be an ID (identifier) detected by a wireless communication device or an ID that is arbitrarily set by the driver. When the target object is a vehicle, the registration number described in a number plate of the vehicle may be read and taken as the name. For example, the name of a target object detected by the front image monitoring device 14 and an image [of the target object] can be displayed on the overhead information presenting device 12, thereby notifying the driver [of the target object].

3) Position, Size and Shape

This item describes the position, size (region) and shape of a target object. The position of the target object is represented as the position vector based on the position of the driver's face. The size of the target object can be represented as a two-dimensional region. For example, the display 25*a* of the navigation device 25 can be represented as a rectangular region which is illustrated with four coordinates showing the four corners of the display 25*a*. The shape is represented as an apparent shape of the target object, such as a sphere or a rectangular solid. The shape can also be represented in the form of three-dimensional CAD data or other form. For example, the shape of the hood 53, which appears to the driver as a swollen three-dimensional shape, can be adopted in the form of the CAD data of the vehicle.

4) Registered Device

This item describes the devices registered in the target list storage unit 278 (the target detector 251 and face direction/gaze direction information using portion 253).

5) List of Devices to be Notified

This item describes a list of devices that are notified of a result of determination by the determination portion 279 (notification target devices). The determination portion 279 refers to this item and notifies the devices registered in the determination target list of a result of determination so as to be able to notify a plurality of devices and to devices other than the devices in which the target objects are registered.

6) Output Form

This item describes a form that is used when the determination portion 279 outputs the result of determination. For example, output forms [for outputting the face direction or gaze direction], such as outputting the face direction or gaze direction "in three-dimensional vector form" or "in polar coordinate form" can be specified.

7) Time Required for Detecting Target Object

This item describes the time at which a target object is detected. [This item] sometimes describes time in which no target object is detected. Accordingly, the devices can be used according to time in which a target object is detected.

8) Condition of Determination Period

This item describes a condition of determination period in which the determination portion 279 performs determination on a target object. Examples of the condition of determination period include "when there is a request from a device," "a predetermined time interval such as one second," "when the status of a target object enters a predetermined status," "when the status of a person such as a driver or pedestrian enters a predetermined status," "when the status of a vehicle such as the base vehicle, oncoming vehicle or leading vehicle enters a predetermined status," and the like. For a target object present outside the vehicle, a determination cycle can be set to be shorter as the speed of the vehicle increases, so that delayed determination can be prevented when [the vehicle] travels at high speeds. For a target object present outside the vehicle, the determination cycle can be set to be shorter when the distance to the target object is short, so that delayed determination can be prevented when the time [the vehicle] approaches the target object is short. When the degree at which the driver should confirm the target object is high, the determination cycle is set to be short so that the fact that the driver does not confirm the target object can be detected appropriately.

9) Registration Deletion Condition

This item describes a condition for deleting the target information from the determination target list. Examples of the condition include "when a request for deletion is sent from a device that registers a target object," "when the time that is set at the time of registration has passed," "when a device to be used no longer detects the registered target object," "when no more target objects are detected," "when the target object enters a predetermined status," "when a person enters a predetermined status," "when a vehicle enters a predetermined status," and the like.

10) Degree of Cautiousness about Target Object

This item describes the degree indicating that a target object is the one to be aware of. The information of this item is used by the face direction/gaze direction information using portion 253. For example, when a pedestrian, bicycle, or obstacle is detected as the target object in front of the base vehicle traveling on a traffic lane, the degree of cautiousness about this target object is set to be high. Furthermore, for example, the degree of cautiousness about a road sign taken as a target object is set to be high. The degree of cautiousness may be set to a plurality of levels. Alternatively, the degree of cautiousness may be set to be high when the speed of the base vehicle is high.

11) Explanation of Target Object

This item describes the explanation or detailed information of a target object. The information of this item is used by the face direction/gaze direction information using portion 253. For example, the information of this item can be displayed on the overhead information presenting device 12 or output in the form of a sound by the sound response device 26.

12) Degree of Attention

This item describes the degree of attention indicating whether a target object "should be paid attention" or "should not be paid attention." In this item, whether [the target object] "should be paid attention" or "should not be paid attention" is expressed in, for example, values of 100 or 0. For example, it is dangerous for the driver to see the operation panel 60b of the air conditioner device 60, the display 24a of the audio device 24, or the scenery on the side of the vehicle for a long time while traveling. Therefore, the "degree of attention" is set to be low for these target objects. On the other hand, it is extremely dangerous [for the driver] to overlook a pedestrian or bicycle d running in front [of the vehicle], the pedestrian or bicycle being detected by the front image monitoring device 14, and thus the driver should confirm safety by looking a front road region while traveling. Therefore, the "degree of attention" is set to be high for this target object.

13) Response to Status

This item describes the "degree of attention" corresponding to a status of the driver or a traveling status of the vehicle when the "degree of attention" described in 12) above changes in accordance with the status of the driver or the traveling status of the vehicle. In this item, the "degree of attention" is expressed in, for example, numeric values of 0 to 100. For example, it is dangerous to observe the display 24a of the audio device 24 or the cellular phone for a long time while traveling, but this is not a problem when the vehicle is parked. Therefore, for the target object such as the display 24a of the audio device 24 or the cellular phone, low "degree of attention" is described at the time of traveling, and high "degree of attention" is described at the time of driving. Moreover, for example, although it is not necessary to see the front when the vehicle is parked, it is necessary to see the front and confirm safety when traveling. Therefore, for the target object existing in front, high "degree of attention" is described at the time of traveling, and low "degree of attention" is described at the time of stopping the vehicle. In addition, for example, although [the driver] should not see a display showing residual amount of a fuel tank for a long time, it is necessary to often confirm [the residual amount of the fuel tank] because the gas might run out if the driver drives the vehicle on an express way without seeing the display showing the residual amount of the fuel tank. The same can be said for a speedometer. For such target objects, high, medium and low "degrees of attention" are set in accordance with the length of time in which the driver does not see [the target objects].

14) Notification Contents

This item describes a condition for specifying a range of notification contents. Contents of this item can be set for each target object or each notification target device.

Figure 15:
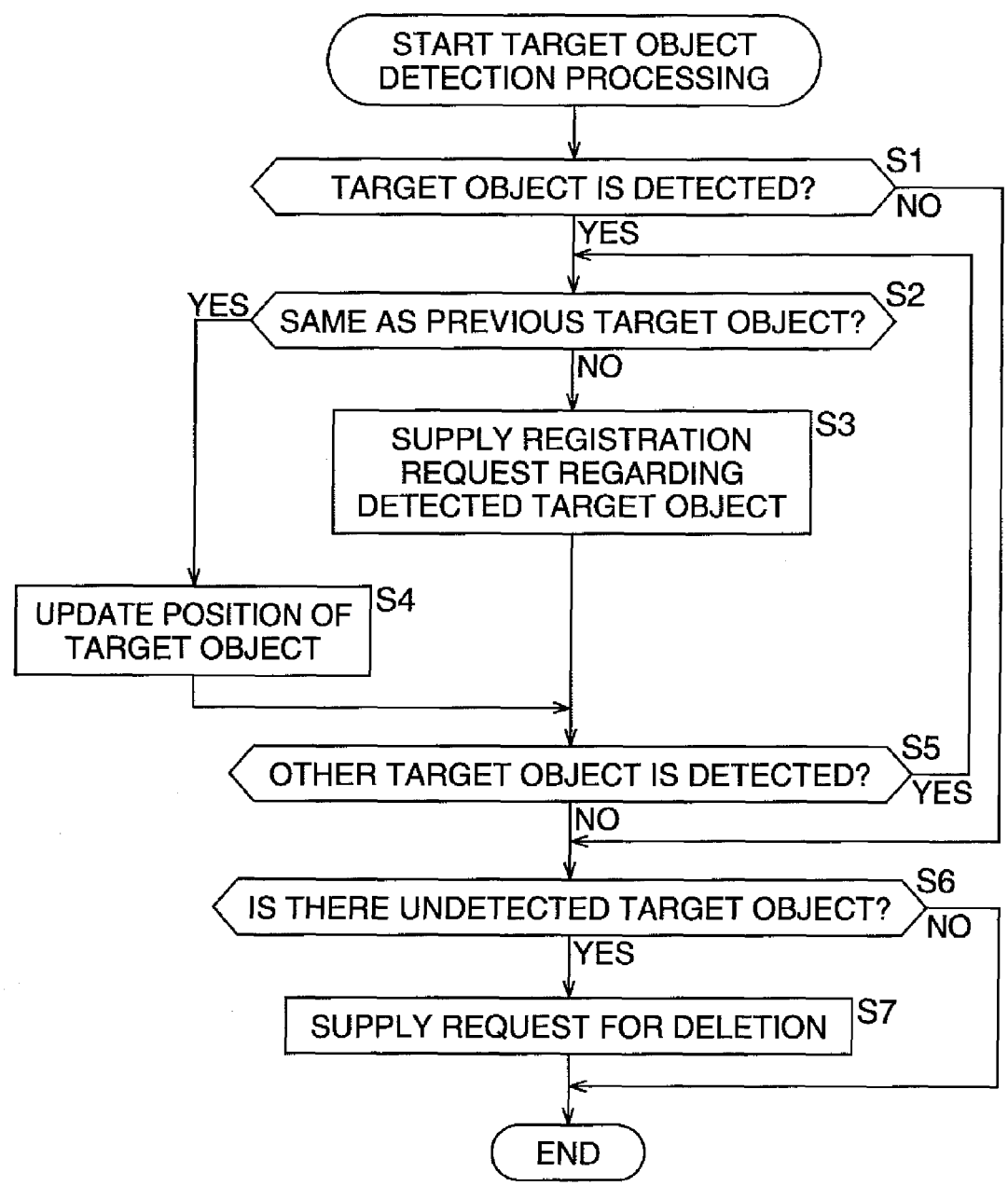
FIG. 15 is a flowchart for explaining target object detection processing.

Next, the flowchart of FIG. 15 is used to explain target object detection processing of the target detector 251 detecting the dynamic target object. Here, an example of a case where the front image monitoring device 14 serves as the target detector 251 to perform the processing. This processing is started when, for example, the on-vehicle system 1 is activated, and is repeatedly executed until the on-vehicle system 1 is stopped. Note that the timing of starting or ending the processing is also applied to the flowcharts shown in after-mentioned FIG. 16 to FIG. 19.

First, in step S1, the target detector 251 (front image monitoring device 14) captures one image, and determines whether or not a target object is detected within the resultant image. When it is determined in step S1 that the target object is not detected, the target detector 251 carries the processing forward to step S6.

When, on the other hand, it is determined in step S1 that the target object is detected, the target detector 251 determines in step S2 whether or not the detected target object is the same as a previous target object. As described hereinafter, because the processing of step S1 is repeated on regular or irregular basis, [the detected target object] might be the same as the previously detected target object. For this reason, in processing of step S2, it is determined whether or not the target object detected in the processing of the present step S1 is the same as the target object detected in the processing of the previous step S1.

When it is determined in step S2 that the detected target object is not the same as the previously [detected] target object, the target detector 251, in step S3, supplies the registration request regarding the detected target object and the attribution information of the detected target object to the target list registration portion 276 of the face direction/gaze direction detector 252.

When it is determined in step S2 that the detected target object is the same as the previously [detected] target object, the target detector 251, in step S4, supplies the information on 3) position, size and shape out of the attribute information of the detected target object to the target list registration portion 276 and updates [the position of the target object].

After the processing of step S3 or step S4, the target detector 251 determines in step S5 whether or not other target object is detected within the image captured in the processing of step S1. When it is determined in step S5 that other target object is detected, the target detector 251 carries the processing back to step S2 and repeats the processings of steps S2 through S5 described above.

When, on the other hand, it is determined in step S5 that other target object is not detected, the target detector 251, in step S6, compares the image captured in the processing of step S1 with a previous image to determine whether there is any undetected target object. When it is determined in step S6 that there is no undetected target object, the processing is ended. Note that even when there is no previous image, it is determined in step S6 that there is no undetected target object.

When, on the other hand, it is determined in step S6 that there is an undetected target object, the target detector 251, in step S7, supplies the request for deletion of the undetected target object to the target list registration portion 276 of the face direction/gaze direction detector 252, and ends this processing.

Because the processings from steps S1 to S7 are repeated until the on-vehicle system 1 is stopped as described above, in the on-vehicle system 1, detection of the dynamic target object is constantly executed, the registration request corresponding to a newly detected target object is supplied to the target list registration portion 276, and the request for deletion corresponding to an undetected target object is supplied to the target list registration portion 276.

Figure 16:
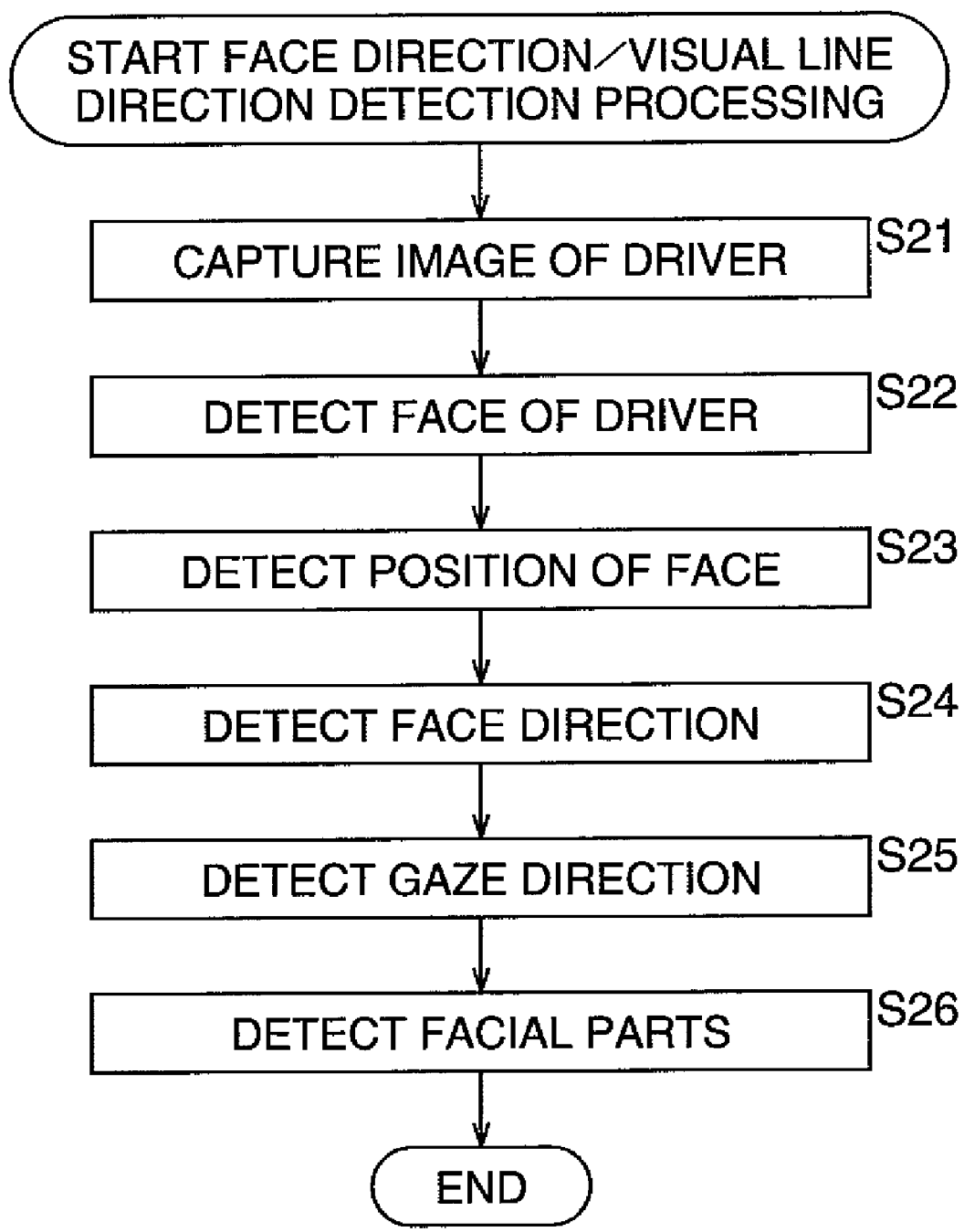
FIG. 16 is a flowchart for explaining face direction/gaze direction detection processing.

Next, the flowchart of FIG. 16 is used to explain face direction/gaze direction detection processing performed by the face direction/gaze direction detector 252.

First, in step S21 the imaging portion 271 captures an image of the driver as a subject, and supplies the resultant image to the face detector 272.

In step S22, the face detector 272 detects a region of the driver's face from the image supplied by the imaging portion 271, and supplies an image of the detected face region (face image) to the face direction detector 273, gaze direction detector 274, and facial feature status detector 275.

In step S23, the face detector 272 detects the position of the driver's face on the basis of the image of the driver captured by the imaging portion 271 and the control information of the face direction/gaze direction information using portion 253, and supplies a result of the detection as face position information to the face direction detector 273, gaze direction detector 274, facial feature status detector 275, and face direction/gaze direction converter 277.

In step S24, the face direction detector 273 detects the face direction of the driver from the face image of the driver that is supplied by the face detector 272, and supplies a result of detection as face direction information to the determination portion 279.

In step S25, the gaze direction detector 274 detects the gaze direction of the driver from the face image of the driver that is supplied by the face detector 272, and supplies a result of detection as gaze direction information to the determination portion 279.

In step S26, the facial feature status detector 275 detects the facial features of the driver's face, such as the eyes, nose, mouth, eyebrows, ears and the like, from the face image of the driver that is supplied by the face detector 272, supplies a result of detection as facial feature information to the determination portion 279, and ends this processing.

Figure 17:
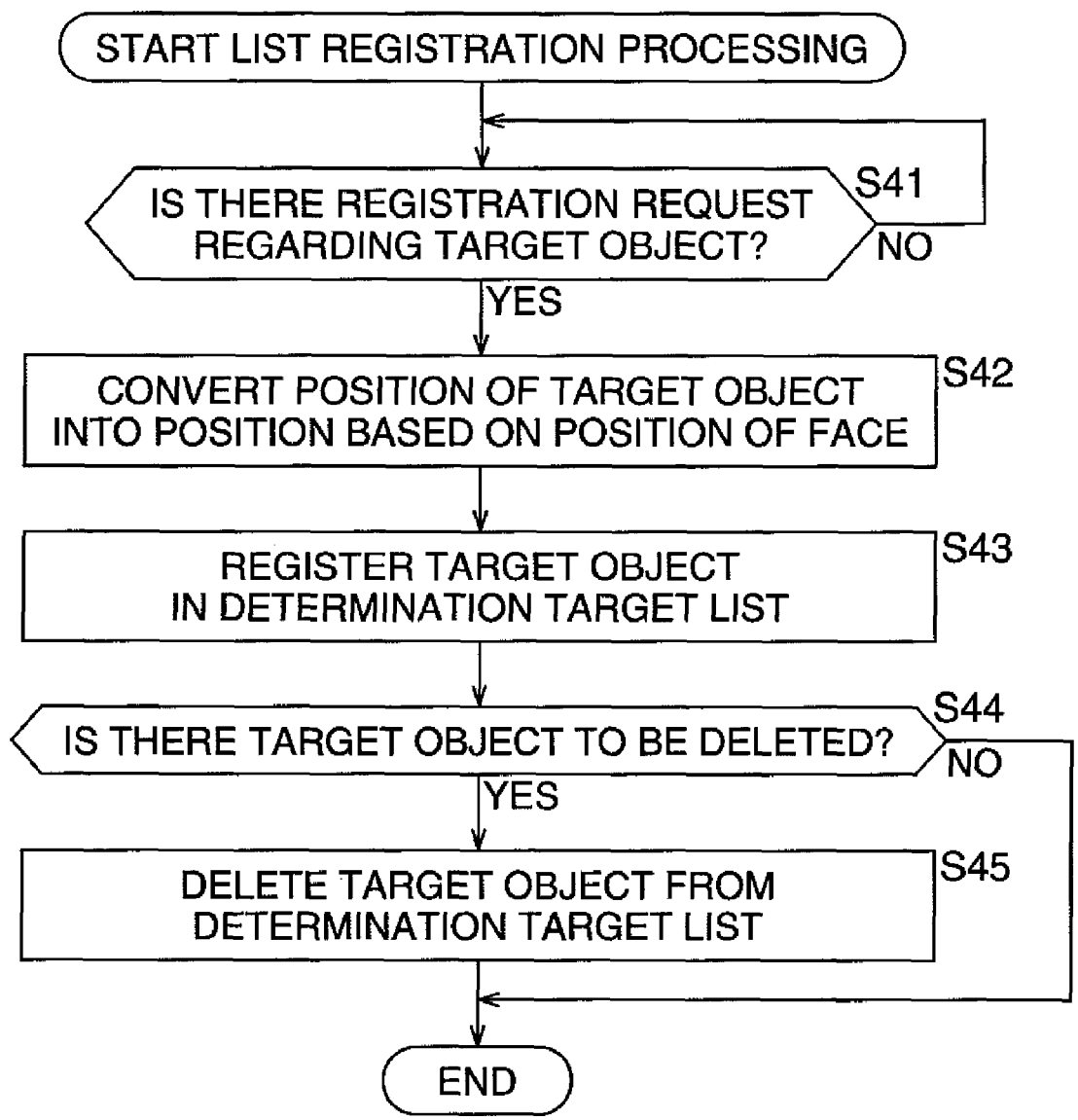
FIG. 17 is a flowchart for explaining list registration processing.

Next, the flowchart of FIG. 17 is used to explain list registration processing performed by the face direction/gaze direction detector 252.

First, in step S41, the target list registration portion 276 determines from the target detector 251 or face direction/gaze direction information using portion 253 whether there is the registration request regarding a target object, and stands by until it is determined that there is the registration request for the target object.

When it is determined in step S41 that there is the registration request regarding the target object, the target list registration portion 276, in step S42, supplies, to the face direction/gaze direction converter 277, the position of a target object, which is contained in the attribute information of the target object for which the registration request is supplied, and converts the position of the target object into the position based on the position of the driver's face. The face direction/gaze direction converter 277 converts the supplied target object position into the position based on the position of the driver's face.

In step S43, the target list registration portion 276 supplies the target information containing the converted position to the target list storage unit 278, and thereby registers the target object in the determination target list.

In step S44, the target list registration portion 276 determines whether or not there is a target object to be deleted from the determination target list. When there is a target object, the request for deletion of which is supplied from the target detector 251 or which satisfies the registration deletion condition contained in the target information, it is determined in step S44 that there is a target object to be deleted from the determination target list. When it is determined in step S44 that there is no target object to be deleted, step S45 is skipped, and this processing is ended.

When, on the other hand, it is determined in step S44 that there is a target object to be deleted, the target list registration portion 276, in step S45, deletes the target object determined to be deleted, from the determination target list of the target list storage unit 278, and ends this processing.

Figure 18:
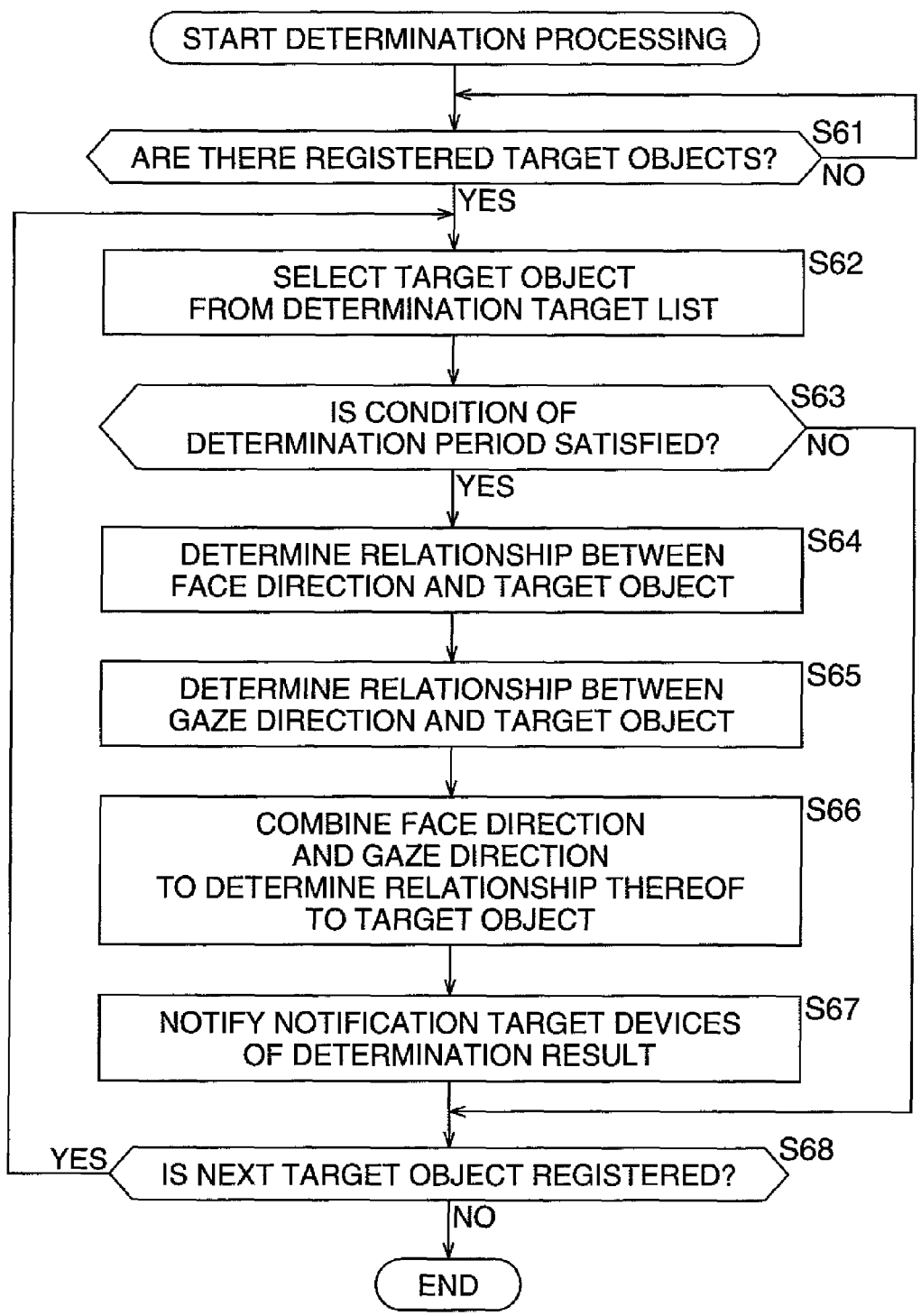
FIG. 18 is a flowchart for explaining determination processing.

Next, the flowchart of FIG. 18 is used to explain determination processing for performing determination on the target objects registered in the determination target list.

First, the determination portion 279 determines in step S61 whether or not there are target objects registered in the form of the determination target list in the target list storage unit 278, and repeats the processing of step S61 until [the determination portion 279] determines that there are target objects registered [in the target list storage unit 278].

Then, when it is determined in step S61 that there are target objects registered [in the target list storage unit 278], the determination portion 279 selects one target object from the determination target list in step S62. In the first processing performed after the processing of step S61, the target object stored in the position of the address AD1 is selected, as described with reference to FIG. 13. The target object selected here is referred to as "selected target object" hereinafter.

In step S63, the determination portion 279 determines whether or not the selected target object satisfies the condition of determination period that is contained in the attribute information [of the selected target object]. When it is determined in step S63 that [the selected target object] does not satisfy the condition of determination period, steps S64 to S67 are skipped, and the processing is carried forward to step S68.

When, on the other hand, it is determined in step S63 that [the selected target object] satisfies the condition of determination period, the determination portion 279 determines the relationship between the face direction of the driver and the target object in step S64, determines the relationship between the gaze direction of the driver and the target object in step S65, and determines the relationship between a combination of the face direction and gaze direction of the driver and the target object in step S66. Note that in steps S64 to S66 the facial feature information supplied from the facial feature status detector 275 is used according to need.

In step S67, the devices described in "5) list of devices to be notified" (notification target devices) contained in the attribute information of the selected target object are notified of the results of the determinations performed in steps S64 to S66.

In step S68, the determination portion 279 determines whether or not the next target object is registered. When it is determined in step S68 that the next target object is registered, this processing is carried back to step S62, and the processings of steps S62 to S68 are repeated. Specifically, when an address that is stored along with the selected target object in the target list storage unit 278 shows [the address] other than the address ADRED of the last item, the target object stored in this address is selected as the next selected target object, the relationship between the face direction or gaze direction of the driver and the target object is determined, and the notification target devices are notified of a result of the determination.

When, on the other hand, it is determined in step S68 that the next target object is not registered, or in other words, when the address stored along with the selected target object in the target list storage unit 278 shows the address ADRED of the last item, the processing is ended.

Examples of the determinations performed by the determination portion 279 in the abovementioned steps S64 to S66 will now be further explained.

Based on whether a registered target object is in a direction same as the gaze direction of the driver, the determination portion 279 determines whether or not the driver sees the target object, and notifies [the devices] of [a result of the determination]. Specifically, when gaze direction of the driver is directed toward a target region constituted by the direction and size of the target object, the determination portion 279 determines that the driver sees the target object. Conversely, for a target object in a target region to which the gaze direction of the driver is not directed, [the determination portion 279] can determine that the driver does not see the target object, and notify [the devices] of [a result of the determination]. For example, the determination portion 279 can determine whether or not [the driver] sees a leading vehicle traveling at least 100 m away from [the driver's vehicle] on an express way. The determination portion 279 can further determine whether or not [the driver] sees an alarm indicator showing the residual amount of the fuel tank. The determination portion 279 can further determine which one of selected items displayed on the display [the driver] sees.

Note that the determination portion 279 may notify angle information showing a directional difference between the face direction or gaze direction of the driver and the direction of the target object, directly as the results of the determinations.

In the course of turning driver's face direction or gaze direction, the moving gaze might pass the target region. When the speed of movement of the gaze direction is high, [the driver] might not sufficiently see the target region that the driver's gaze direction passed. The fact that the face direction moves in correspondence with the gaze direction is detected by detecting the face direction and gaze direction of the driver independently, hence such circumstance can be determined precisely. The determination portion 279 can determine that [the driver] sees the target object when the gaze direction is directed to the target region within a predetermined time period, and notify a result of the determination. For example, the gaze direction moving for two seconds is analyzed, and, when the gaze direction remains directed toward the target region for at least, for example, 0.5 second, it can be determined that [the driver] does not see [the target object]. The time during which the gaze direction should remain directed can be changed in accordance with the speed of the vehicle, relative movement speed of the target object, degree of urgency, and the like. A ratio between times when the gaze direction is held in the target region within the predetermined time period may be added as the result of determination.

Moreover, even when the driver sees the target object, [the number of] minute movements of the driver's gaze direction directed to the target object decreases if a driver's attentiveness decreases. Based on such movements of the driver's gaze direction, the determination portion 279 determines the decreases of the driver's attentiveness, and notifies [a result of the determination]. Note that in order to determine the decrease of the attentiveness, the facial feature information such as a change in blinks of the driver or a change in facial expression, or biometrical information such as the temperature, blood pressure and pulse of the driver may be added. The determination portion 279 may also notify how much the attentiveness decreases.

Based on the face direction or gaze direction of the driver and the direction of a target object seen from the driver, the determination portion 279 determines whether or not the driver drives inattentively, and notifies a result of the determination. Specifically, when the driver sees the target object, the degree of attention of which is set to be high, the determination portion 279 determines that the driver does not drive inattentively. The determination portion 279 can also seta limit time and, for the target object, the degree of attention of which is set to be high, can determine that [the driver] drives inattentively when [the driver] sees the target object for the set limit time or more. Note that the degree of inattentive driving may be added to the result of the determination.

Furthermore, the determination portion 279 can determine a movement of the driver from the face direction or gaze direction of the driver and notify a result of the determination. In this case, the determination portion 279 may set all of the target objects registered in the determination target list as the notification target devices, or the determination portion 279 may select a notification target device by itself.

For example, when the face direction of the driver moves while the gaze direction of the driver remains directed toward the same direction as the face direction, it is determined that a simple head shaking is performed. Because [the driver] cannot see a specific direction during this simple head shaking movement, it is determined that [the driver] does not see the specific target object, and this result is notified.

Moreover, when one tries to see an object that is not in his/her view, this person turns his/her head to a direction where he/she can see [the object]. In such a movement, the angle of the gaze direction moves toward a direction to turn before the angle of the face direction turns. Therefore, when the gaze direction with an angle larger than the angle of the face direction changes noniteratively, the determination portion 279 determines that the driver performs a turning movement.

For example, when the neck [of the driver] is tired, the driver intentionally shakes his/her head by rotating or tilting his/her head. When the face direction of the driver moves vertically or horizontally and the gaze direction remains directed in a specific direction, the determination portion 279 determines that [the driver] intentionally shakes his/her head.

There is sometimes detect a movement of the driver in which after moving the [driver's] face vertically or horizontally, [the face] is stopped for one second or less then returned to [the original position]. When this movement of the face direction and the movement of the gaze direction confirm to each other, the determination portion 279 determines that the driver sees the direction in which [the driver] stops [moving his/her face]. Also, when the face direction is changed and then returned while the gaze direction remains directed to the vicinity of a specific region, the determination portion 279 determines that the driver moves his/her head portion while seeing a certain target object. When the face direction is changed and then returned iteratively while the gaze direction remains directed to the vicinity of the specific region, [the determination portion 279] determines that the driver moves his/her head portion while seeing the target object.

When the speed of the vehicle is not zero, and the face direction of the driver is directed downward for a long time, the determination portion 279 determines that the driver loses consciousness. In order to enhance certainty, this determination may be performed by calling out by a sound to confirm whether there is a reaction. In addition, when the driver loses consciousness sinking back in the seat, the face direction is sometimes directed forward, hence the determination portion 279 determines that [the driver] loses consciousness if the gaze direction of the driver is directed in a specific fixed direction for a long time instead of a target object, the degree of attention of which is set to be high.

During a conversion or when receiving a question from a device, the driver sometimes unconsciously nods his/her head or shakes his/her head horizontally to express negative intention. When the gaze direction is not changed and only the face direction is moved once or several times back and forth in vertical or horizontal direction, the determination portion 279 can perform determination on such movements of the driver.

Figure 19:
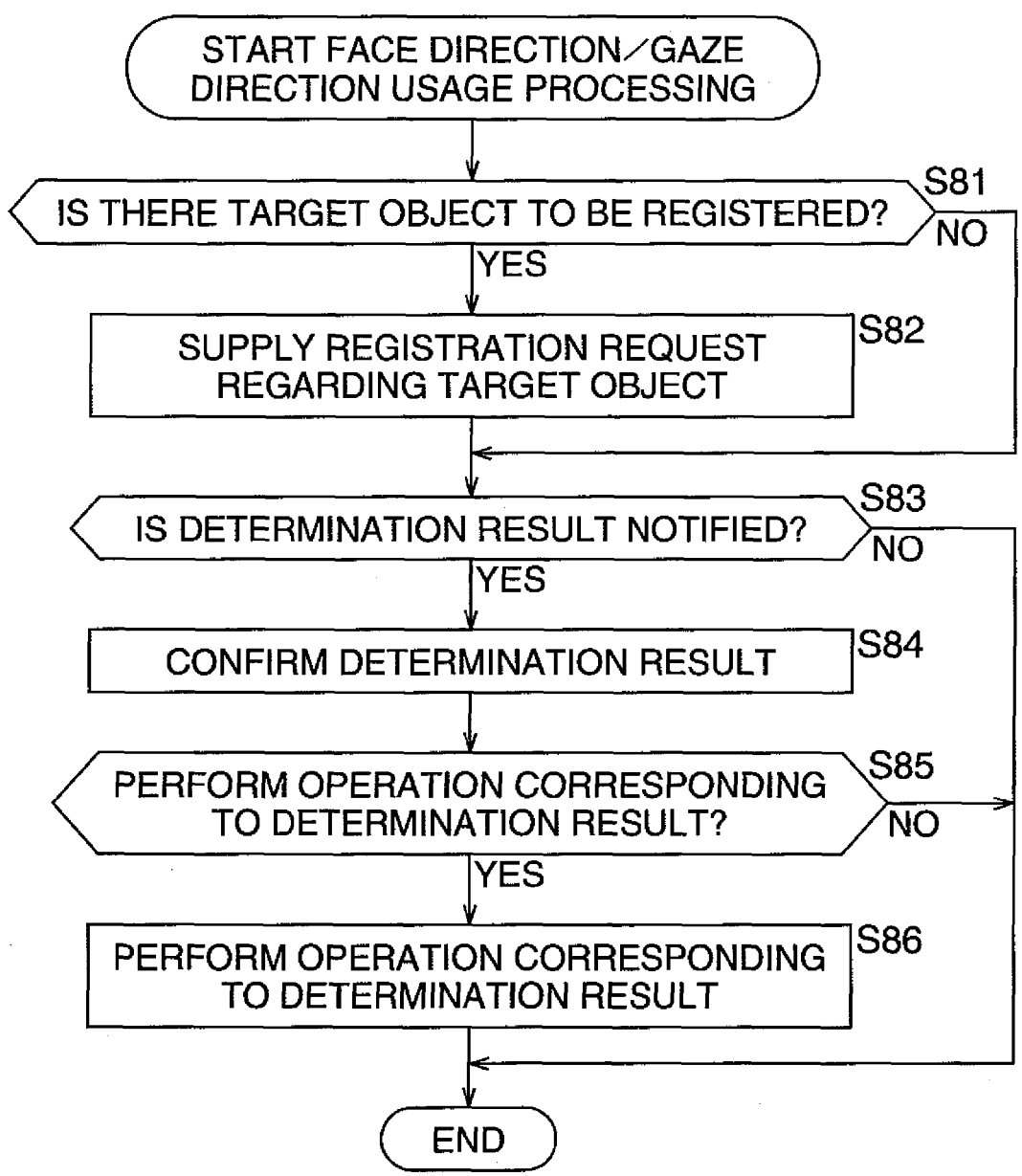
FIG. 19 is a flowchart for explaining face direction/gaze direction usage processing.

Next, the flowchart of FIG. 19 is used to explain face direction/gaze direction usage processing performed by the face direction/gaze direction information using portion 253. Note that the following explanation of the face direction/gaze direction information usage processing supportively explains, if necessary, an example of a case in which the face direction/gaze direction information using portion 253 is the power window control device 22.

First, in step S81, the face direction/gaze direction information using portion 253 determines whether or not there is a static target object to be registered in the determination target list of the target list storage unit 278. When it is determined in step S81 that there is no static target object to be registered in the determination target list, this processing is carried forward to step S83.

When, on the other hand, it is determined in step S81 that there is a static target object to be registered in the determination target list, the face direction/gaze direction information using portion 253 supplies the registration request regarding the target object to the face direction/gaze direction detector 252 in step S82. For example, the power window control device 22 supplies the registration request regarding the power window switch 64.

In step S83, the face direction/gaze direction information using portion 253 determines whether or not a result of determination is notified. When it is determined in step S83 that a result of determination is not notified, this processing is ended.

When, on the other hand, it is determined in step S83 that a result of determination is notified, the face direction/gaze direction information using portion 253 confirms in step S84 a result of determination supplied by the determination portion 279. For example, a result of determination indicating that the gaze direction of the driver is directed toward the power window switch 64 is supplied to the power window control device 22, and the power window control device 22 confirms the content [of the result].

In step S85, the face direction/gaze direction information using portion 253 determines whether to perform an operation corresponding to the result of determination, and when determining not to perform the operation corresponding to the result of determination, [the face direction/gaze direction information using portion 253] ends the processing.

When, on the other hand, [the face direction/gaze direction information using portion 253] determines in step S85 to perform the operation corresponding to the result of determination, the face direction/gaze direction information using portion 253 performs the operation corresponding to the result of determination in step S86, and ends the processing. For example, as the operation corresponding to the result of determination, the power window control device 22 lights the light of the power window switch 64.

As described above, because a movement or status of a person can be identified by the information on the direction of the face or direction of the gaze of the person, the devices can be caused to perform the processing in response to the movement or status of the person. Note that in the examples described above, one determination is made on one registered target object, but a plurality of registered target objects can be combined, and determinations can be made on the combined target objects.

In the embodiment described above, although the imaging portion 11*a* of the driver monitoring device 11 that is attached above the rearview mirror 75 detects both the face direction and gaze direction of the driver, the imaging portion 11*a* of the driver monitoring device 11 that is attached above the rearview mirror 75 may detect specifically the face direction of the driver, and a gaze direction camera for capturing an image of the driver's from the front may be provided, in order to recognize the driver's gaze direction easily. In this case, the driver's gaze direction detected by the gaze direction camera is expressed by an angle based on the front of the driver's face, and thus it is necessary to convert [this angle] into the final gaze direction of the driver (final gaze direction) which should be obtained primarily. The final gaze direction is expressed by the sum of the angle of the gaze direction detected by the gaze direction camera and the angle of the face direction of the driver (final gaze direction=gaze direction angle+face direction angle).

Figure 20:
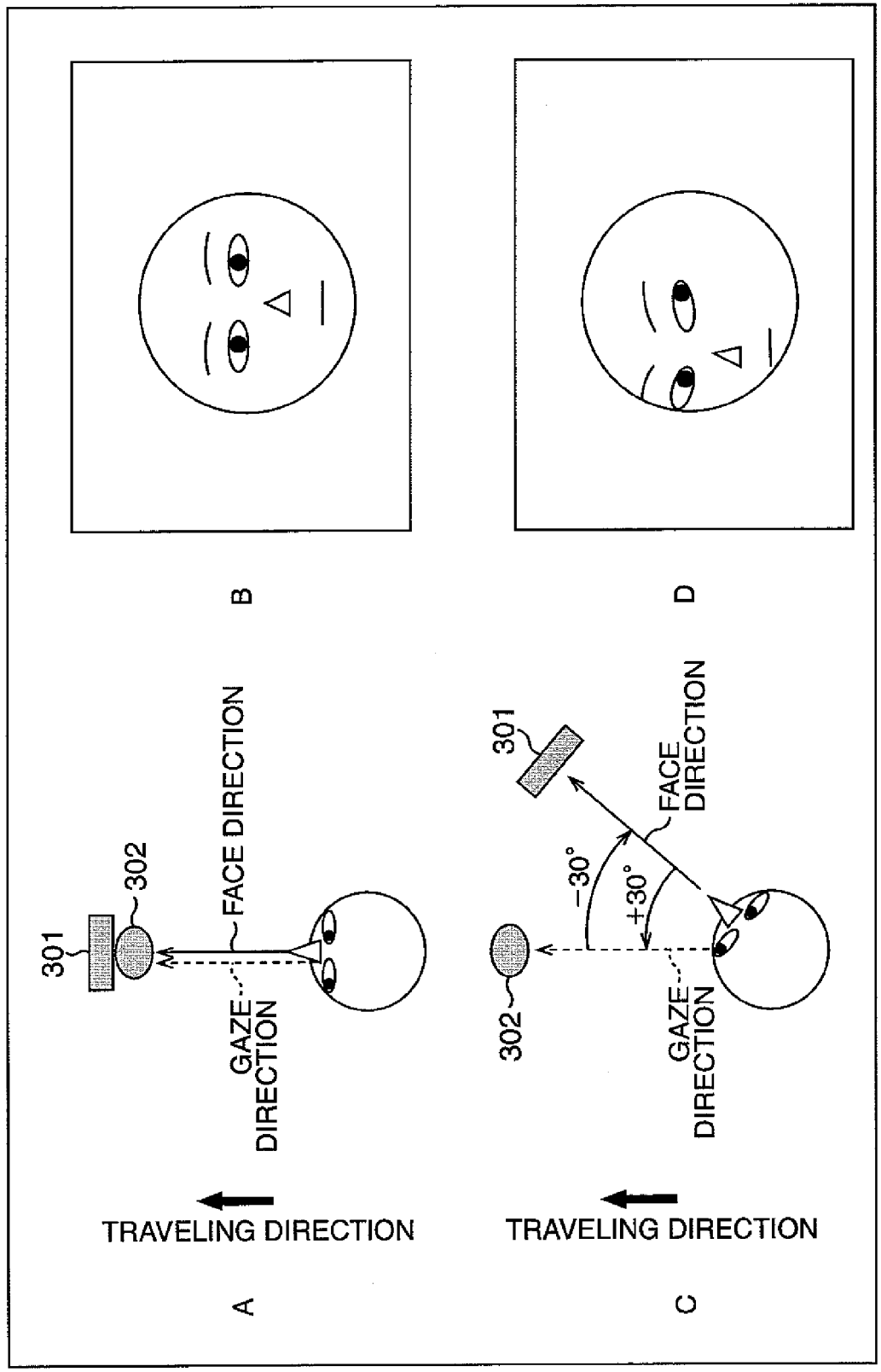
FIG. 20 is a drawing for explaining a method for calculating a final gaze direction.
Figure 21:
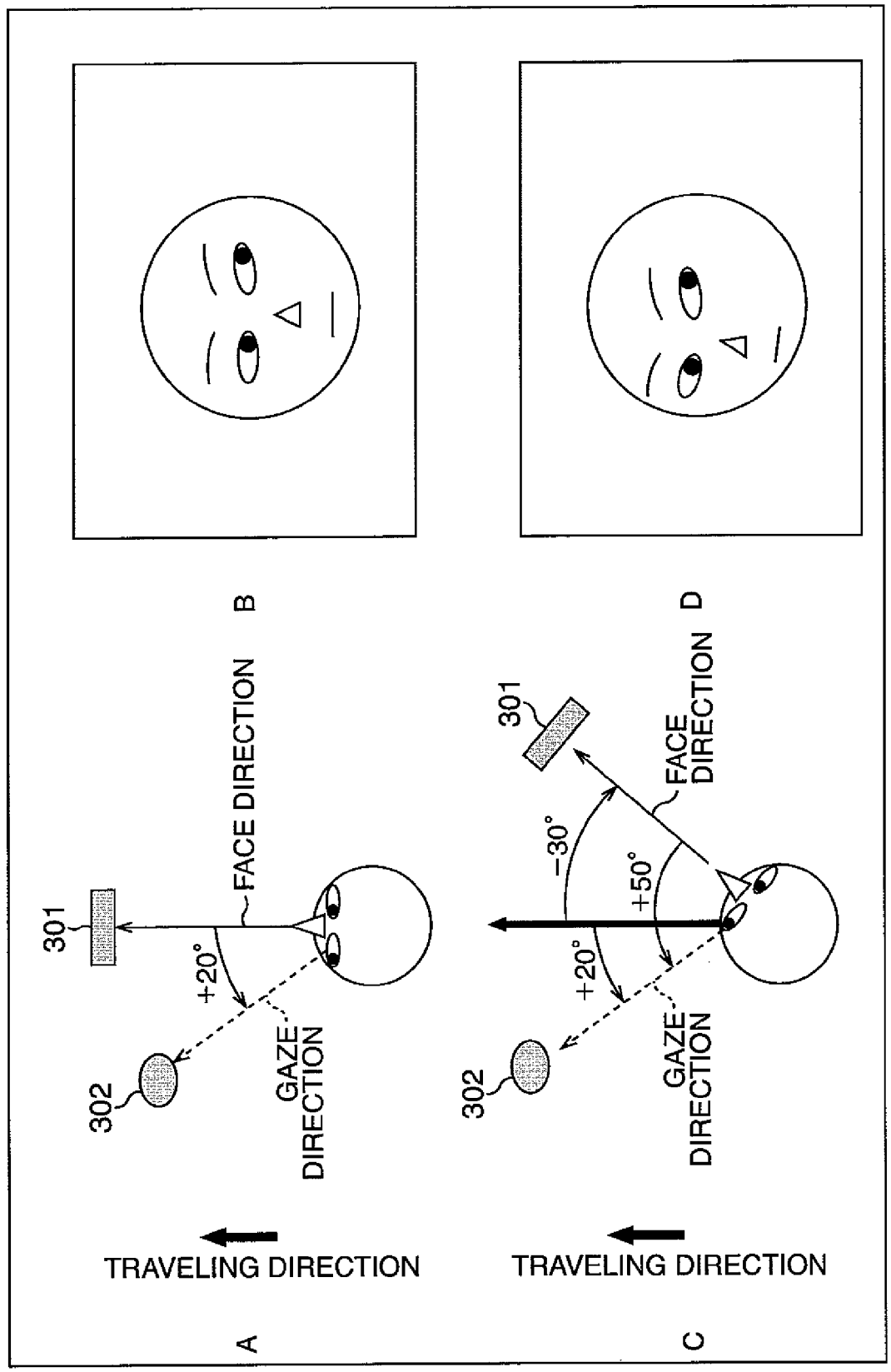
FIG. 21 is a drawing for explaining the method for calculating the final gaze direction.

FIG. 20 and FIG. 21 are used to explain a method for calculating the final gaze direction for a case in which the gaze direction camera for always capturing an image of the driver's face from the front is provided. FIG. 20 shows an example of a case where a target object exists in a direction same as the traveling direction (in front of the base vehicle), and FIG. 21 shows an example of a case where the target object is located 20 degrees to the left of the traveling direction. Note in FIG. 20 and FIG. 21 that the traveling direction is shown as a reference direction and a counterclockwise direction from the reference direction [forms] a positive-angle.

FIG. 20A is an overhead view of a state in which the driver sees a target object 302 in front of the base vehicle [of the driver] at a face direction angle of 0 degree. A gaze direction camera 301 is located in front of the driver's face, and this camera 301 captures an image of the driver's face as shown in FIG. 20B. In this case, the angle of the final gaze direction is 0 degree without calculating.

FIG. 20C is an overhead view of a state in which the driver sees the target object 302 in front of the base vehicle [of the driver] at a face direction angle of −30 degrees. In FIG. 20C as well, the gaze direction camera 301 is located in front of the driver's face, and this camera 301 captures an image of the driver's face as shown in FIG. 20D. In this case, the angle of the gaze direction detected from the image captured by the gaze direction camera 301 is calculated as +30 degrees on the basis of the face direction. On the other hand, because the angle of the face direction is detected as −30 degrees on the basis of the reference direction, the final gaze direction is 0 degree (final gaze direction=gaze direction angle+face direction angle=+30−30=0 degree).

On the other hand, FIG. 21A is an overhead view of a state in which the driver sees the target object 302, which is located +20 degrees from the traveling direction, at a face direction angle of 0 degree. The gaze direction camera 301 is located in front of the driver's face, and this camera 301 captures an image of the driver's face as shown in FIG. 21B. In this case, the angle of the gaze direction detected from the image captured by the gaze direction camera 301 is calculated as +20 degrees on the basis of the face direction. On the other hand, because the angle of the face direction is detected as 0 degree on the basis of the reference direction, the final gaze direction is +20 degrees (final gaze direction=gaze direction angle+face direction angle=+20+0=+20 degree).

FIG. 21C is an overhead view of a state in which the driver sees the target object 302, which is located +20 degrees from the traveling direction, at a face direction angle of −30 degrees. In FIG. 21C as well, the gaze direction camera 301 is located in front of the driver's face, and this camera 301 captures an image of the driver's face as shown in FIG. 21D. In this case, the angle of the gaze direction detected from [the image captured by] the gaze direction camera 301 is calculated as +50 degrees on the basis of the face direction. On the other hand, because the angle of the face direction is detected as −30 degrees on the basis of the reference direction, the final gaze direction is +20 degree (final gaze direction=gaze direction angle+face direction angle=+50−30=+20 degree).

By using the information on the target objects recorded in the determination target list, the status of the driver can be determined accurately. Specific examples will now be described hereinafter.

The driver sees the target object inside the vehicle, such as the operation panel 24b of the audio device 24, operation panel 25b of the navigation device 25, operation panel 60b of the air conditioner device 60, steering wheel 61, the combination switch 62 attached with a light switch, windshield wiper switch, indicator switch and the like, hazard indicator 63, or power window switch 64. Also, in order to confirm the front while driving, the driver sees in the direction of the target object outside the vehicle, such as the guardrails 124a to 124d, reflectors 125a to 125i attached to the guardrails 124a to 124d, road sign 126, traffic light 127, fallen object 128 on the road 121, building 129, leading vehicle 130, or pedestrian 131.

The actions that the driver should, may, or must not perform in relation to the gaze direction or face direction vary according to the target objects and circumstances. Moreover, the necessity for observation by directing the gaze varies according to the target objects. For example, because the guardrails 124a to 124d can be viewed easily and are unlikely to be overlooked, the necessity for observation by directing the gaze is low. It is a problem if the pedestrian 131 present in the traveling direction is overlooked, and thus the necessity for observation by directing the gaze is high. Therefore, when the target objects detected by the target detector 251, such as the guardrails 124a to 124d and pedestrian 131, are registered in the determination target list, the degree of attention for the guardrails 124a to 124d is set to be low and the degree of attention for the pedestrian 131 is set to be high so that determination corresponding to each degree of attention can be performed.

The degree at which the driver may or must not see in the direction of the target objects changes in accordance with whether the vehicle is traveling or stopped. For example, a traveling driver should not observe the operation panel 24b of the audio device 24. However, it is not a problem [for the driver] to observe and operate the audio device 24 when the vehicle is stopped.

By registering the operation panel 24b of the audio device 24 in the determination target list so as to notify that the gaze is directed [to the operation panel 24b], an intention of the driver to operate the audio device 24 can be detected. Furthermore, by detecting that the gaze is directed toward a volume display portion or channel display portion which is a part of the operation panel 24b and outputting [a result of detection] as a control signal to the audio device 24, the convenience in operating [the operation panel 24b] can be enhanced. Since it is a problem to direct the gaze to each part of the audio device 24 and observe it while driving, a warning should be notified. Therefore, when the vehicle is traveling, the degree of attention for the audio device 24, which is the target object, is set to be low, and when the vehicle is stopped, the degree of attention for the audio device 24 is set to be high, whereby determination corresponding to each status can be performed appropriately.

Moreover, by allowing a period for performing determination to be set for each target object, the status of the person can be determined in accordance with the relationship between the target object and the face direction or gaze direction, depending on how often the determination is made, whereby the devices can be controlled more appropriately.

For example, the period for determining the status of the driver on the basis of the relationship of the face direction and gaze direction of the person and the target object can be set. By setting the period, determination can be performed at appropriate timing at which the determination should be performed. When the pedestrian 131 is detected as a target object, it is determined whether the gaze is directed every 0.5 second during the period in which the pedestrian 131 is detected, and [a result of determination] is outputted, whereby it can be found out whether the driver sees the pedestrian.

By controlling the audio device 24 in response to a movement of the driver's gaze direction, the audio device 24 can be operated when the driver directs the gaze toward the audio device 24. However, it is not necessary to detect the fact that the gaze is directed to, for example, the volume display portion, which is a part of the operation panel 24b, when the audio device 24 is turned off. Therefore, when, for example, the engine of the automobile is off, the audio device 24 is registered in the determination target list such that the fact that the driver sees [the audio device 24] is detected and output, and when the power of the audio device 24 is switched on, the settings of the determination target list are changed such that the fact that the driver sees, for example, a volume operation portion or sound quality operation portion, which is a part of the operation pane 124b, is detected every 0.5 second. Accordingly, a detailed determination can be performed whenever necessary so that fruitless processing is not performed. Consequently, when the number of target objects to be registered in the determination target list is increased, [the number of] fruitless processings can be reduced.

Note in the present specification that the steps described in the flowcharts include not only the processings performed in chronological order according to the described sequence, but also the processings that may not necessarily be executed in chronological order but are executed in parallel or individually.

Moreover, in the present specification "system" means an entire device constituted by a plurality of devices.

Note that the embodiment of the present invention is not limited to the above-described embodiment and various modifications can be made without departing from the scope of the present invention.

The invention claimed is:

1. A monitoring device comprising:
a face direction detector that detects a face direction of a person;
a gaze direction detector that detects a gaze direction of the person;
a determination portion that determines a movement or a status of the person based on a relationship between a target object coming into view of the person and the face direction or the gaze direction, and outputs a result of the determination to a control device; and
a target list registration portion that registers the target object in a determination target list,
wherein the determination portion determines the movement or the status of the person based on the relationship between the target object registered in the determination target list and the face direction or the gaze direction.

2. A monitoring device further comprising:
a face direction detector that detects a face direction of a person;
a gaze direction detector that detects a gaze direction of the person;
a determination portion that determines a movement or a status of the person based on a relationship between a target object coming into view of the person and the face direction or the gaze direction, and outputs a result of the determination to a control device; and
a target object detection device that detects a dynamic target object,
wherein the dynamic target object appears in or disappears from the view of the person.

3. The monitoring device according to claim 1, wherein the target list registration portion registers the target object in the determination target list based on a registration request by the control device.

4. The monitoring device according to claim 1, wherein the determination target list comprises at least one of a period for executing the determination, information of the control device to which the result of the determination is outputted, and a condition for deleting the target object from the determination target list.

5. A monitoring device comprising:
a face direction detector that detects a face direction of a person;
a gaze direction detector that detects a gaze direction of the person;
a determination portion that determines a movement or a status of the person based on a relationship between a target object coming into view of the person and the face direction or the gaze direction, and outputs a result of the determination to a control device;
a face position detector that detects a position of the face of the person; and
a position converter that converts a position of the target object into a position based on the position of the face of the person,
wherein the determination portion determines the movement or the status of the person based on the relationship between the target object based on the position of the face of the person and the face direction or the gaze direction of the person.

6. The monitoring device according to claim 1, further comprising:
a facial feature status detector that detects a status of a facial feature of the person,
wherein the determination portion determines the movement or the status of the person based on the status of the facial feature of the person.

7. A monitoring method comprising:
registering a target object in a determination target list;
detecting a face direction of a person;
detecting a gaze direction of the person;
determining a movement or a status of the person based on a relationship between the target object coming into view of the person and the face direction or the gaze direction of the person,
wherein the determining step comprises determining the movement or the status of the person based on the relationship between the target object registered in the determination target list and the face direction or the gaze direction of the person; and
outputting a result of the determination to a control device.

8. A computer program product comprising a non-transitory computer readable medium encoded with a program, the program when executed performing steps comprising:
registering a target object in a determination target list;
detecting a face direction of a person;
detecting a gaze direction of the person;
determining a movement or a status of the person based on a relationship between the target object coming into view of the person and the face direction or the gaze direction of the person,
wherein the determination step comprises determining the movement or the status of the person based on the relationship between the target object registered in the determination target list and the face direction or the gaze direction of the person; and
outputting a result of the determination to a control device.

9. The monitoring device according to claim 2, wherein the target list registration portion registers the dynamic target object in the determination target list based on a registration request by the target object detection device.

* * * * *